(12) United States Patent
Green et al.

(10) Patent No.: US 10,265,646 B2
(45) Date of Patent: Apr. 23, 2019

(54) METHODS FOR SORTING NANOTUBES BY WALL NUMBER

(71) Applicant: Northwestern University, Evanston, IL (US)

(72) Inventors: Alexander A. Green, Boston, MA (US); Mark C. Hersam, Wilmette, IL (US)

(73) Assignee: NORTHWESTERN UNIVERSITY, Evanston, IL (US)

( * ) Notice: Subject to any disclaimer, the term of this patent is extended or adjusted under 35 U.S.C. 154(b) by 0 days.

(21) Appl. No.: 14/625,333

(22) Filed: Feb. 18, 2015

(65) Prior Publication Data

US 2016/0009559 A1 Jan. 14, 2016

Related U.S. Application Data

(62) Division of application No. 12/536,250, filed on Aug. 5, 2009, now abandoned.

(60) Provisional application No. 61/086,302, filed on Aug. 5, 2008.

(51) Int. Cl.
| | | |
|---|---|---|
| *C01B 32/172* | (2017.01) | |
| *B01D 21/26* | (2006.01) | |
| *B03D 3/00* | (2006.01) | |
| *B82Y 15/00* | (2011.01) | |
| *B82Y 30/00* | (2011.01) | |
| *B82Y 40/00* | (2011.01) | |

(52) U.S. Cl.
CPC ............ *B01D 21/262* (2013.01); *B03D 3/00* (2013.01); *B82Y 15/00* (2013.01); *B82Y 30/00* (2013.01); *B82Y 40/00* (2013.01); *C01B 32/172* (2017.08); *C01B 2202/06* (2013.01)

(58) Field of Classification Search
CPC .... C01B 31/0266; B01D 21/262; B03D 3/00; B82Y 15/00; B82Y 30/00; B82Y 40/00
USPC ........ 438/105, 931; 977/749, 750, 752, 843, 977/845, 936, 938; 257/20, 24, 76, 77, 257/368, 613
See application file for complete search history.

(56) References Cited

U.S. PATENT DOCUMENTS

| | | | | |
|---|---|---|---|---|
| 7,682,523 B2 * | 3/2010 | Weisman | ............... | B82Y 25/00 106/31.64 |
| 7,811,542 B1 * | 10/2010 | McElrath | ............... | B82Y 10/00 423/447.2 |

(Continued)

FOREIGN PATENT DOCUMENTS

| | | |
|---|---|---|
| DE | 102005041378 B1 | 3/2007 |
| WO | 2007061143 A1 | 5/2007 |

OTHER PUBLICATIONS

Chattopadhyay et al., "A Route for Bulk Separation of Semiconducting from Metallic Single-Wall Carbon Nanotubes," J. Am. Chem. Soc., 125:3370-3375 (2003).

(Continued)

*Primary Examiner* — Ori Nadav
(74) *Attorney, Agent, or Firm* — Locke Lord LLP; Tim Tingkang Xia, Esq.

(57) ABSTRACT

The present teachings provide methods for sorting nanotubes according to their wall number, and optionally further in terms of their diameter, electronic type, and/or chirality. Also provided are highly enriched nanotube populations provided thereby and articles of manufacture including such populations.

6 Claims, 9 Drawing Sheets

(56) References Cited

U.S. PATENT DOCUMENTS

| | | | | |
|---|---|---|---|---|
| 7,938,987 B2* | 5/2011 | Grigorian | ............... | B82Y 30/00 252/500 |
| 7,938,991 B2* | 5/2011 | Armeniades | ........... | B82Y 30/00 264/12 |
| 8,021,747 B2* | 9/2011 | Yi | ........................ | B82Y 10/00 252/502 |
| 8,182,782 B1* | 5/2012 | Moravsky | ............... | B82Y 10/00 423/445 R |
| 8,465,647 B2* | 6/2013 | Bol | .................... | B01D 17/0217 210/634 |
| 2006/0046480 A1* | 3/2006 | Guo | ....................... | B82Y 10/00 438/685 |
| 2006/0205105 A1* | 9/2006 | Maruyama | ............. | B82Y 10/00 438/50 |
| 2006/0216221 A1 | 9/2006 | Lee | | |
| 2006/0253942 A1* | 11/2006 | Barrera | .................. | B82Y 15/00 73/661 |
| 2007/0062411 A1* | 3/2007 | Weisman | ............... | B82Y 25/00 106/31.15 |
| 2007/0253888 A1* | 11/2007 | Liu | ........................ | B82Y 30/00 423/447.1 |
| 2008/0008925 A1* | 1/2008 | Deng | .................. | H01M 4/8657 429/431 |
| 2008/0048364 A1* | 2/2008 | Armeniades | ........... | B82Y 30/00 264/328.1 |
| 2009/0061194 A1 | 3/2009 | Green et al. | | |
| 2009/0173918 A1 | 7/2009 | Hersam et al. | | |
| 2009/0297846 A1 | 12/2009 | Hata et al. | | |

OTHER PUBLICATIONS

Huh et al., "Separation and Characterization of Double-Wall Carbon Nanotube Subpopulations," J. Phys. Chem. C., 114:11343-11351 (2012).

Lu et al., "Determination of Carbon Nanotube Density by Gradient Sedimentation," J. Phys. Chem. B., 110:24371-24376 (2006).

Nair et al., "Dynamics of Surfactant-Suspended Single-Walled Carbon Nanotubes in a Centrifugal Field," Langmuir, 24:1790-1795 (2008).

Rinzler, "Sorting out carbon nanotube electronics," Nature Nanotechnology, 1:17-18 (2006).

Yu et al., "Separation of Mixed SWNTs and MWNTs by Centrifugal Force—an Experimental Study," IEEE, 1212-1216 (2007).

Arnold et al., "Encapsulation of Carbon Nanotubes by Self-Assembling Peptide Amphiphiles," Langmuir, 21:4705-4709 (2005).

Arnold et al., "Enrichment of Single-Walled Carbon Nanotubes by Diameter in Density Gradients," Nano Letters, 5 (4):713-718 (2005).

Arnold et al., "Sorting carbon nanotubes by electronic structure using density differentiation," Nature Nanotechnology, 1:60-65 (2006).

Barros et al., Raman spectroscopy of double-walled carbon nanotubes treated with H2SO4, Physical Review B, 76:045425-1-045425-11 (2007).

Endo et al., "'Buckypaper' from coaxial nanotubes," Nature, 433:476 (2005).

Green et al., "Ultracentrifugation of single-walled nanotubes," Materials today, 10(12):59-60 (2007).

Green et al., "Colored Semitransparent Conductive Coatings Consisting of Monodisperse Metallic Single-Walled Carbon Nanotubes," Nano Letters, 8(5): 1417-1422 (2008).

Hersam, "Progress towards monodisperse single-walled carbon nanotubes," Nature Nanotechnology, 3:387-394 (2008).

Kim et al., "Fabrication of High-Purity, Double-Walled Carbon Nanotube Buckypaper," Chem. Vap. Deposition, 12:327-330 (2006).

Kishi et al., "Enhanced Photoluminescence from Very Thin Double-Walled Carbon Nanotubes Synthesized by the Zeolite-CCVD Method," J. Phys. Chem. B., 110:24816-24821 (2006).

Lyu et al., "Synthesis and characterization of high-quality double-walled carbon nanotubes by catalytic decomposition of alcohol," Chem. Commun., 1404-1405 (2003).

Okada et al., "Curvature-Induced Metallization of Double-Walled Semiconducting Zigzag Carbon Nanotubes," Physical Review Letter, 91 (21 ):21680 1-1-216801-4 (2003).

Osswald et al., "Elimination of D-band in Raman spectra of double-wall carbon nanotubes by oxidation," Chemical Physics Letters, 402:422-427 (2005).

Pfeiffer et al., "Fine structure of the radial breathing mode of double-wall carbon nanotubes," Physical Review B, 72: 161404(R) (2005).

Sugai et al., "New Synthesis of High-Quality Double-Walled Carbon Nanotubes by High-Temperature Pulsed Arc Discharge," Nano Letters, 3(6):769-773 (2003).

Wang et al., "Field-Effect Characteristics and Screening in Double-Walled Carbon Nanotube Field-Effect Transistors," J. Phys. Chem. B., 109(37): 17361-17365 (2005).

Green et al., "Processing and properties of highly enriched double-walled carbon nanotubes," Nature Nanotechnology, 4(1):64-70 (2009).

\* cited by examiner

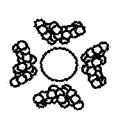 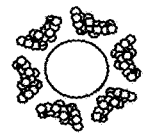 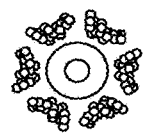
FIG. 1A    FIG. 1B    FIG. 1C
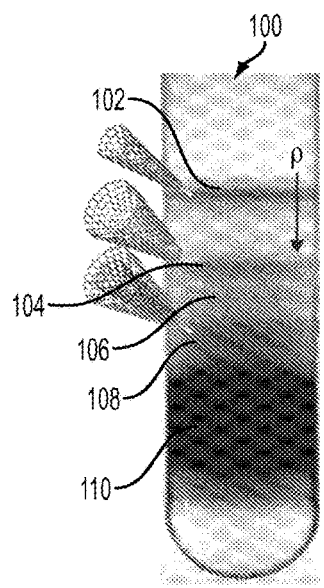 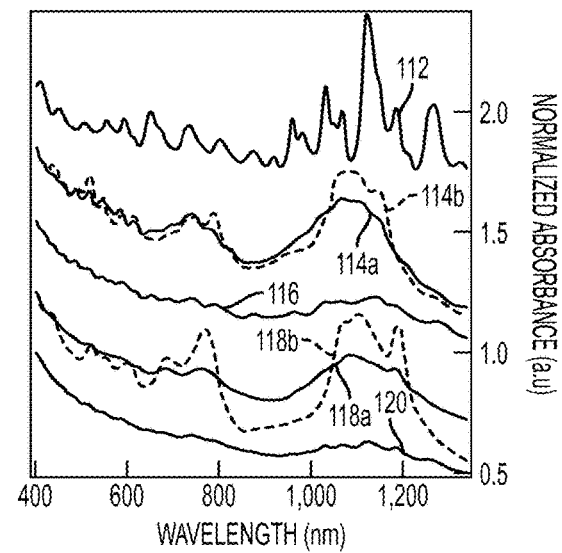
FIG. 2A    FIG. 2B

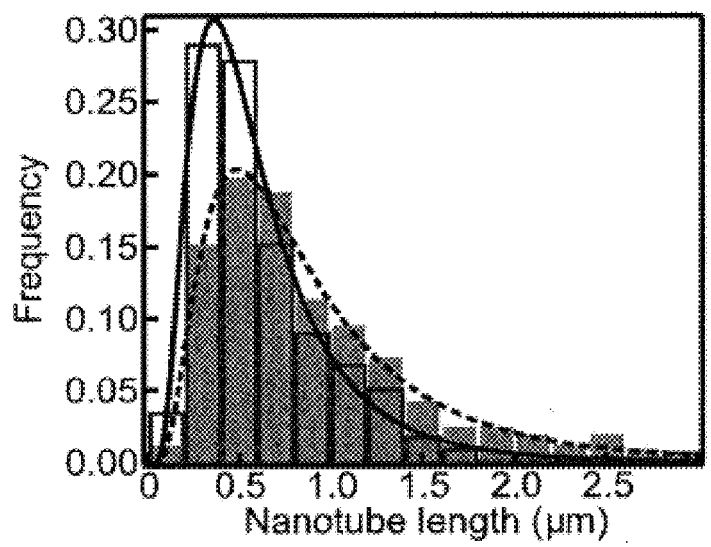
FIG. 5
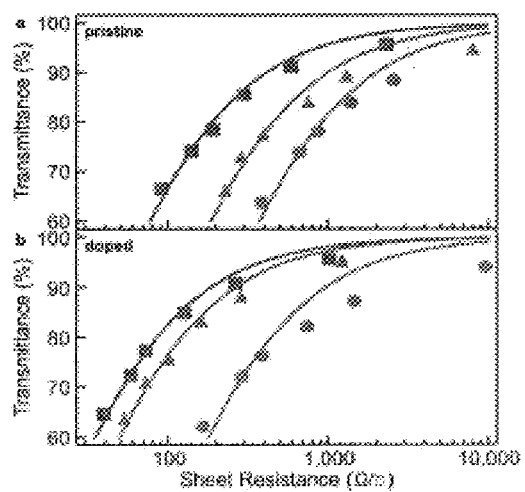
FIG. 6A
FIG. 6B

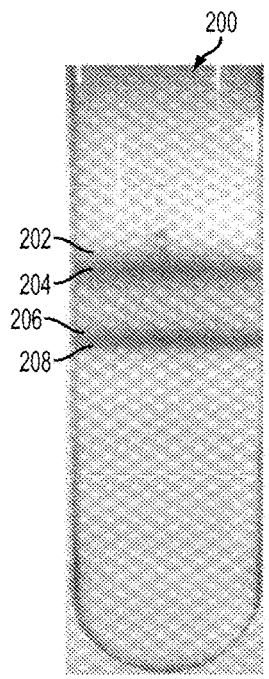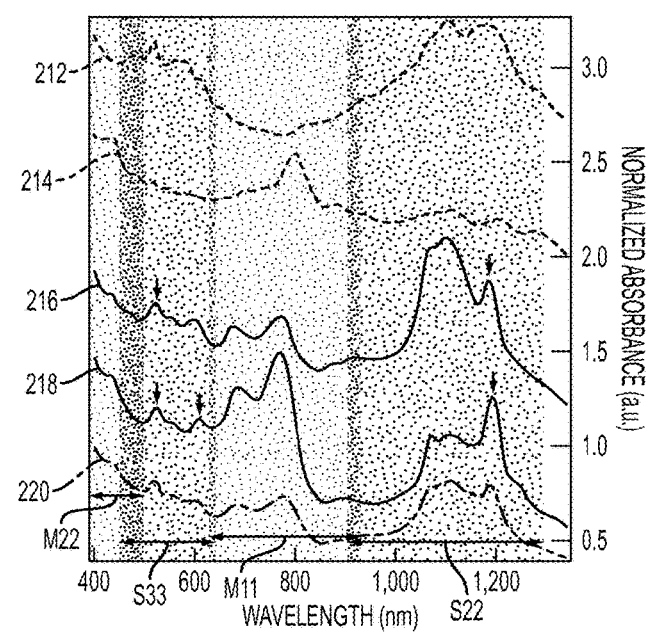
FIG. 7A  FIG. 7B
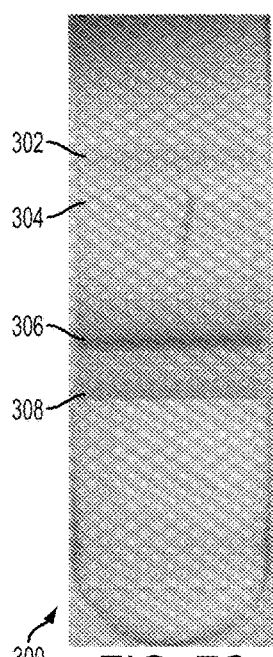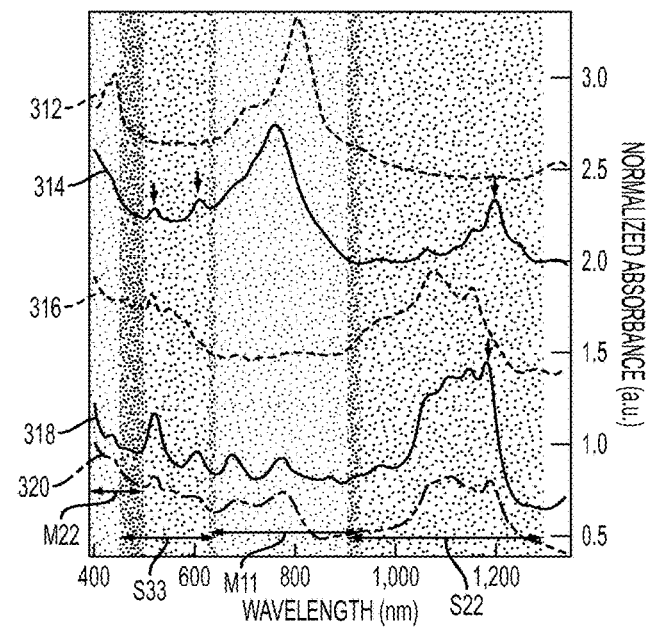
FIG. 7C  FIG. 7D

FIG. 10A
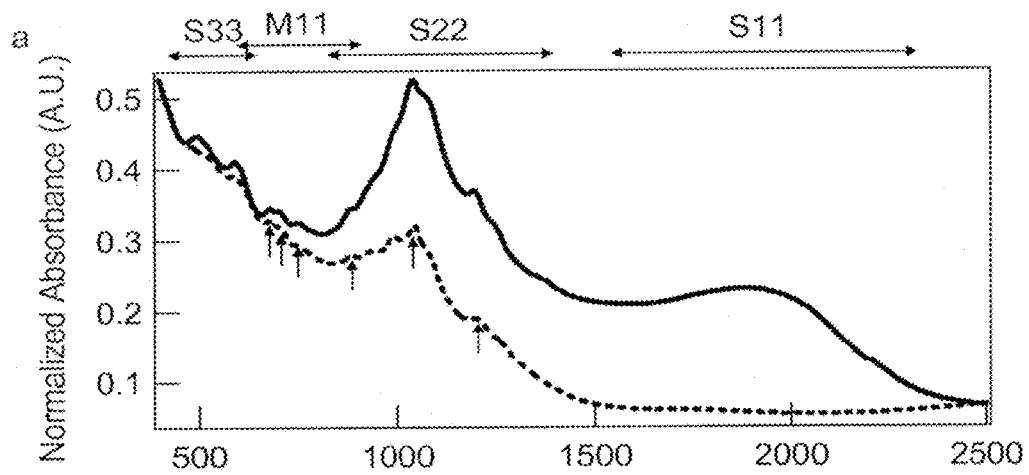
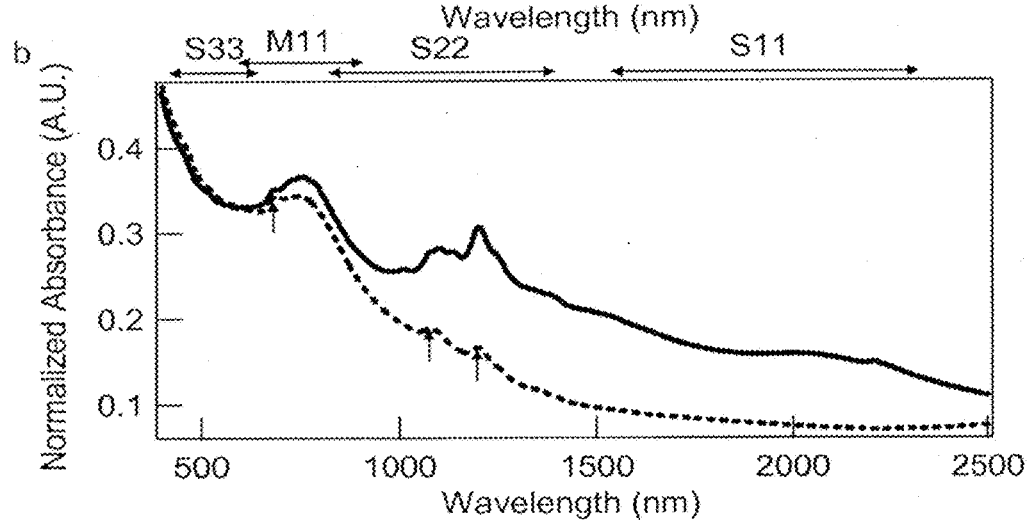
FIG. 10B

METHODS FOR SORTING NANOTUBES BY WALL NUMBER

CROSS REFERENCE TO RELATED APPLICATION

This application is a divisional of and claims priority to and the benefit of patent application Ser. No. 12/536,250 filed Aug. 5, 2009, which claimed priority to and the benefit of provisional patent application Ser. No. 61/086,302, filed Aug. 5, 2008, each of which is incorporated by reference herein.

STATEMENT REGARDING FEDERALLY SPONSORED RESEARCH OR DEVELOPMENT

This invention was made with government support under grant numbers EEC-0647560 and DMR-0706067 awarded by the National Science Foundation. The government has certain rights in the invention.

BACKGROUND

Carbon nanotubes are one-dimensional nanomaterials consisting of cylinders of graphene. Depending on their diameter and helicity, carbon nanotubes consisting of a single graphene tubule, known as single-walled carbon nanotubes (SWCNTs), can behave either as metals or semiconductors whose band gap varies inversely with tube diameter. Multi-walled carbon nanotubes, which consist of multiple concentric graphene cylinders, typically possess much larger diameters than SWCNTs. Accordingly, these carbon nanotubes demonstrate metallic or small band gap semiconducting behavior, and are mechanically stronger than SWCNTs. Developments in carbon nanotube synthesis have enabled the preferential production of multi-walled carbon nanotubes consisting of two walls. These double-walled carbon nanotubes (DWCNTs) can be synthesized using methods including chemical vapor deposition, electric arc discharge, and coalescence of chains of $C_{60}$ inside SWCNTs. DWCNTs have garnered increasing attention for applications because their structure provides them with characteristics situated between those of SWCNTs and multi-walled carbon nanotubes having three or more walls (MWCNTs). Compared to SWCNTs and MWCNTs, DWCNTs have demonstrated better performance parameters in field-effect transistors, improved spatial resolution and longer scanning lifetimes as atomic force microscope (AFM) tips, and more desirable field emission characteristics.

Despite their promising applications, current methods of synthesizing DWCNTs also produce significant quantities of unwanted SWCNTs and MWCNTs. Multiple groups have succeeded in increasing the proportion of DWCNTs following synthesis using high temperature oxidation, which preferentially destroys the more thermally unstable SWCNT impurities. However, these oxidative treatments can degrade the electrical and optical properties of DWCNTs, and are ineffective at removing MWCNTs because DWCNTs and MWCNTs exhibit similar thermal stabilities.

As a result, more refined separation methods are required to provide nanotube populations that are highly enriched with DWCNTs. Furthermore, beyond separation by wall number, practical applications also require DWCNT materials that are enriched according to chirality, diameter and/or electronic type to ensure that their electrical and optical properties are uniform.

SUMMARY

In light of the foregoing, the present teachings relate to methods of separating nanotubes by wall number. In particular, the present methods can provide nanotube subpopulations that are selectively enriched with double-walled nanotubes (DWNTs), multi-walled nanotubes having three or more walls (MWNTs), or single-walled nanotubes (SWNTs) from a mixed (or polydisperse) nanotube population including DWNTs, MWNTs, and SWNTs. Because MWNTs generally have larger mean outer wall diameters than DWNTs, and DWNTs generally have larger mean outer wall diameters than SWNTs, in part, the present methods can be directed to separating nanotubes by diameter. For nanotubes of different wall numbers that may have overlapping outer wall diameter ranges, the present methods are able to separate among them by wall number. In some embodiments, the present methods also can provide DWNT subpopulations that are selectively enriched by one or more characteristics such as a certain outer wall diameter range, a selected outer wall electronic type, and/or a selected outer wall chirality (n,m) type.

Accordingly, in some embodiments, the present methods allow separation of double-walled carbon nanotubes (DWCNTs) from a mixed population of carbon nanotubes having different wall numbers, thereby providing at least one subpopulation of carbon nanotubes enriched with DWCNTs, that is, the enriched subpopulation has a higher percentage of DWCNTs compared to the mixed population. Because of the non-destructive nature of the present methods, carbon nanotubes other than DWCNTs, e.g., SWCNTs and/or MWCNTs, also can be separated and recovered from the mixed population, thereby providing at least one subpopulation of carbon nanotubes that is enriched with SWCNTs or MWCNTs. Concurrently (i.e., in a single separation cycle) or in different separation cycles, the present methods further allow separating the DWCNTs by one or more characteristics such as diameter, band gap, chirality and/or electronic type, thereby providing DWCNT subpopulations that are enriched by selected characteristic(s). The high-purity DWCNT populations according to the present teachings can offer various improved properties over prior art DWCNT populations. These improved properties can be realized when incorporated into devices and applications such as light emitting diodes, photovoltaics, electrostatic discharge coatings, atomic force microscope tips, flat panel displays, touch screens, electromagnetic screening applications, field-emission displays, biosensors, field-effect transistors, transparent conductors or functional glass, and other functional composite materials including drug delivery materials.

The present methods can be applied to a mixed population of carbon nanotubes that include DWCNTs and one or more types of carbon nanotubes having a wall number other than two. In some embodiments, the mixed population can include DWCNTs and SWCNTs. In other embodiments, the mixed population can include DWCNTs and MWCNTs. In yet other embodiments, the mixed population can include DWCNTs and both SWCNTs and MWCNTs. The mixed population generally includes a certain percentage of DWCNTs but also a significant quantity of SWCNTs and/or MWCNTs. However, in certain embodiments, the mixed population of carbon nanotubes can include a high percentage of DWCNTs, where the DWCNT population exhibits polydispersity in electronic type, diameter, and/or chirality. In such embodiments, the present methods can be applied to separate the polydisperse DWCNT population by one or more of electronic type, diameter, and chirality.

A mixed or polydisperse population of carbon nanotubes can be first contacted with one or more surface active components in a solvent to form a dispersion. The one or more surface active components can be selected for their ability to associate differentially with carbon nanotubes of different wall numbers such that individual carbon nanotubes of different wall numbers, upon association with the surface active components, can exhibit different buoyant densities in the solvent.

In certain embodiments, the one or more surface active components can be substantially insensitive to carbon nanotubes of different electronic types such that semiconducting carbon nanotubes and metallic carbon nanotubes of the same wall number can have substantially similar buoyant densities in the solvent when associated with the one or more surface active components. In embodiments where the mixed population includes SWCNTs and DWCNTs having overlapping outer wall diameter ranges, the one or more surface active components can confer sufficiently different buoyant densities to the encapsulated SWCNTs and DWCNTs to allow separation.

Subsequently, the carbon nanotube dispersion is subjected to density gradient ultracentrifugation (DGU) by introducing the dispersion into a fluid medium including a density gradient. The density gradient can include a linear gradient including three or more layers of different densities. The layers can be prepared with different concentrations of a density gradient medium such as iodixanol. In certain embodiments, the dispersion can be introduced into the density gradient at a density that is different from the respective buoyant densities of the various types of carbon nanotubes in the mixed population as they are associated with the one or more surface active components. For example, the dispersion can be introduced into the fluid medium at a density that is lower than the respective buoyant densities of the various types of carbon nanotubes in the mixed population as associated with the one or more surface active components. In certain embodiments, the dispersion can be layered on top of the linear density gradient.

Once introduced, the fluid medium can be agitated, for example, by ultracentrifugation, to allow separation of the carbon nanotubes by wall number along the density gradient. After sufficient agitation, nanotubes of different wall numbers are allowed to settle into a plurality of separation fractions, where at least one of the separation fractions is enriched with nanotubes of a specific wall number. The separation fractions can be visibly distinguishable among each other by human eye. For example, two or more separation fractions can be distinguishable by different colors and/or different shades of a particular color in the visible spectrum.

A single separation cycle according to the present methods often leads to enrichment that is satisfactory for most applications. Accordingly, following one separation cycle, one or more separation fractions that have been enriched with DWCNTs can be collected from the density gradient. For example, where the mixed population includes 100 carbon nanotubes of any kind, 50 or 50% of the carbon nanotubes can be DWCNTs. In accordance with the present teachings, after a single separation cycle, the mixed population can separate into multiple separable subpopulations, wherein at least one of them is enriched with DWCNTs. For example, in a subpopulation enriched with DWCNTs, there can be 50 carbon nanotubes, among which 40 (or 80%) can be DWCNTs. The proportion of DWCNTs, therefore, has increased from 50% to 80% via one separation cycle, or an enrichment factor of 0.6. In practice, the enrichment factor can be calculated from spectroscopic measurements such as optical absorbance, fluorescence, and raman spectroscopy.

Accordingly, a DWCNT-enriched fraction can be enriched with at least 50% more (an enrichment factor of 0.5), at least 75% more (an enrichment factor of 0.75), at least 100% more (an enrichment factor of 1.0), or at least 200% more (an enrichment factor of 2.0) DWCNTs compared to the percent composition of DWCNTs in the initial mixed population. In certain embodiments, the DWCNT-enriched separation fraction can include greater than about 60%, greater than about 70%, greater than about 80%, greater than about 85%, greater than about 87%, greater than about 90%, greater than about 92%, greater than about 95%, greater than about 97%, or greater than about 99% encapsulated DWCNTs. In some embodiments, the DWCNT-enriched separation fraction can be substantially free of encapsulated SWCNTs. For example, the separation fraction can include less than about 10%, less than about 5%, less than about 3%, less than about 2%, or less than about 1% encapsulated SWCNTs. In particular embodiments, the DWCNT-enriched separation fraction can be substantially free of SWCNTs having diameter ranges overlapping with the outer wall diameter ranges of the DWCNTs in the enriched separation fraction.

Performing one or more additional sorting or separation cycles can improve the quality of the separation and provide increasingly enriched separation fractions. Because bundles of carbon nanotubes tend to form over time, the DWCNT-enriched separation fraction can include impurities such as bundled SWCNTs. To remove these impurities, the DWCNT-enriched separation fraction can be introduced into a second fluid medium including a second density gradient and centrifuged. In particular embodiments, the DWCNT-enriched separation fraction can be introduced at a density that is higher than the buoyant density of DWCNTs in the second fluid medium. In certain embodiments, the DWCNT-enriched separation fraction can be introduced into the fluid medium at the bottom of the density gradient. After sufficient agitation, the DWCNTs and bundled SWCNTs can settle into a plurality of separation fractions that are visibly distinguishable by human eye, allowing collection of a highly DWCNT-enriched separation fraction that is substantially free of bundled SWCNTs. For example, at least about 80% of all the nanotube materials in the highly enriched-DWCNTs separation fraction can include DWCNTs.

In addition to broad distributions of chiralities and diameters, current synthetic methods typically produce a 1:2 ratio of metallic-to-semiconducting carbon nanotubes. The present teachings provide methods of separating carbon nanotubes by wall number and by electronic type, and methods of separating double-walled carbon nanotubes by electronic type. As used herein, when a DWCNT is specified to be of a particular electronic type, the electronic type should be understood as that of the outer wall or shell only unless stated otherwise.

For example, a mixed population of carbon nanotubes that includes semiconducting SWCNTs (s-SWCNTs), metallic SWCNTs (m-SWCNTs), semiconducting DWCNTs (s-DWCNTs) and metallic DWCNTs (m-DWCNTs), or a population of DWCNTs including s-DWCNTs and m-DWCNTs, can be contacted with two or more surface active components in a solvent to form a dispersion. As described above with respect to methods of separating carbon nanotubes by wall number and by diameter, the two or more surface active components typically associate with the carbon nanotubes non-covalently, providing debundled individual carbon nanotubes encapsulated by the two or more surface active components.

The two or more surface active components can be selected for their ability to associate differentially with carbon nanotubes by electronic type as well as simultaneously by wall number and by electronic type such that encapsulated individual carbon nanotubes of different electronic types (and different wall numbers) exhibit different buoyant densities in the solvent. In certain embodiments, the two or more surface active components can include a planar surface active component (e.g., a salt of cholic acid) and a linear surface active component (e.g., a surfactant having an anionic or cationic head group and a linear (flexible or rigid) aliphatic tail group). In some embodiments, the relative ratio of the two or more surface active components can be selected to cause metallic carbon nanotubes to have a different (higher or lower) buoyant density than semiconducting carbon nanotubes regardless of wall number. In certain embodiments, the relative ratio of the two or more surface active components can be selected to cause metallic carbon nanotubes to have a different (higher or lower) buoyant density than semiconducting carbon nanotubes of the same wall number.

The dispersion including the encapsulated carbon nanotubes then can be subjected to density gradient ultracentrifugation (DGU) processing similar to what is described above. After sufficient agitation, carbon nanotubes of different electronic types (and different wall numbers) can settle into a plurality of separation fractions that are visibly distinguishable by human eye, allowing collection of separation fractions that include primarily DWCNTs having an outer wall of a particular electronic type. For example, in some embodiments, the present teachings can provide a population of DWCNTs where greater than about 70%, greater than about 80%, greater than about 85%, greater than about 93%, or greater than about 97% of the DWCNTs have a semiconducting outer wall. In some embodiments, the present teachings can provide a population of DWCNTs where greater than about 50%, greater than about 75%, greater than about 90%, greater than about 97%, or greater than about 99% of the DWCNTs have a metallic outer wall. In some embodiments, the separation fraction can consist essentially of DWCNTs having an outer wall of a particular electronic type. In various embodiments, the DWCNT populations described herein can have a mean outer wall diameter of less than about 1.7 nm.

Using the appropriate surface active component(s), the present teachings also can provide populations of DWCNTs where greater than about 30%, greater than about 50%, greater than about 75%, or greater than about 90% of the DWCNTs have outer walls having the same chirality (n,m) type.

The various methods described herein can be used to sort bulk quantities of nanotubes, for example, populations of nanotubes that include more than about $10^{12}$ nanotubes, more than about $10^{13}$ nanotubes, more than about $10^{14}$ nanotubes, more than about $10^{15}$ nanotubes, more than about $10^{16}$ nanotubes or more than about $10^{17}$ nanotubes; or equivalently, more than about 10 μg, more than about 100 μg, more than about 1 mg, more than about 10 mg, more than about 100 mg, or more than about 1 gram of nanotubes by mass, in a single separation cycle.

The DWCNT populations of the present teachings can be dispersed in a solvent, for example, by contacting them with one or more surface active components including those described herein, to provide colored translucent solutions.

The present DWCNT populations can be incorporated into various articles of manufacture including various electronic, optical, or optoelectronic devices such as field-effect transistors, transparent conductors, interconnect devices, sensors, light-emitting diodes, and solar cells, to improve one or more electronic and/or optical properties of these devices.

Other objects, features, and advantages of the present teachings will be more fully understood from the following figures, description, examples, and claims.

BRIEF DESCRIPTION OF DRAWINGS

It should be understood that certain drawings are not necessarily to scale, with emphasis generally being placed upon illustrating the principles of the present teachings. The drawings are not intended to limit the scope of the present teachings in any way.

FIGS. 1A-C are schematic cross-sectional diagrams showing how surface-active components can associate differentially with a small-diameter single-walled nanotube (FIG. 1A), a large-diameter single-walled nanotube (FIG. 1B), and a double-walled nanotube (FIG. 1C).

FIGS. 2A-B illustrate an embodiment of the present methods by which carbon nanotubes can be sorted by wall number. FIG. 2A is a photograph showing separation of double-walled carbon nanotubes and single-walled carbon nanotubes (visible to human eye as distinct bands of materials) from a polydisperse sample after one separation cycle according to the present methods. FIG. 2B compares the optical absorbance spectra of sorted nanotube materials (collected from the centrifuge tube shown in FIG. 2a from the bands indicated) with the unsorted starting nanotube material.

FIG. 3A and FIG. 3C display the radial breathing mode (RBM) regions for all four nanotube materials at excitation wavelengths of 514.5 nm and 750 nm, respectively. FIG. 3B and FIG. 3D show spectra from the carbon nanotube tangential modes before and after acid treatment.

FIG. 5 shows a histogram summarizing the results of a statistical analysis of the length distribution of single-walled carbon nanotubes (open bars) and double-walled carbon nanotubes (shaded bars) after sorting according to the present teachings.

FIGS. 6A-B show sheet resistance versus transmittance graphs for transparent conductive films prepared from DGU-SWCNTs (triangles), DGU-DWCNTs (squares), and the starting unsorted DWCNT population (circles) at a wavelength of 550 nm. FIG. 6A shows the transparent conductor performance data for pristine (updoped) populations. FIG. 6B shows the transparent conductor performance data following doping with thionyl chloride.

FIGS. 7A-D illustrate certain embodiments of the present teachings by which carbon nanotubes can be sorted by both wall number and outer wall electronic type. FIG. 7A and FIG. 7C are photographs showing separation of double-walled carbon nanotubes having a semiconducting outer wall, double-walled carbon nanotubes having a metallic outer wall, semiconducting single-walled carbon nanotubes, and metallic single-walled carbon nanotubes (visible to human eye as distinct bands of materials) from a polydisperse sample after one separation cycle according to the present methods. In FIG. 7A, the sorting conditions are adapted to favor separation of DWCNTs having a semiconducting outer wall. In FIG. 7B, the sorting conditions are adapted to favor separation of DWCNTs having a metallic outer wall. FIG. 7B and FIG. 7D show the optical absorbance data of sorted materials collected from the centrifuge tubes shown in FIG. 7A and FIG. 7C, respectively, from the bands indicated.

FIGS. 10A-B show the optical absorbance of a DWCNT sample in thin film form that is highly enriched with s-DWCNT before (solid curve) and after (dashed curve) doping treatment with thionyl chloride (FIG. 10A). FIG. 10B shows the optical absorbance of a DWCNT sample in thin film form that is highly enriched with m-DWCNT before (solid curve) and after (dashed curve) doping treatment with thionyl chloride.

FIG. 12A shows the source-drain current ($I_{DS}$) as a function of the gate bias ($V_G$) at different source-drain voltages ($V_{DS}$) for field-effect transistors having a 4 µm×250 µm channel and including a thin film of s-DWCNT (s-DWCNT FET, solid curves) or a thin film of m-DWCNT (m-DWCNT FET, dashed curves) as the active layer. FIG. 12B shows the maximum current as a function of on/off ratio for the s-DWCNT FET (open symbols) and the m-DWCNT FET (closed symbols). Squares are from devices with a channel length of 2 µm and triangles are from devices with a channel length of 4 µm. All devices had a channel width of 250 µm.

DETAILED SPECIFICATION

Figure 3A:
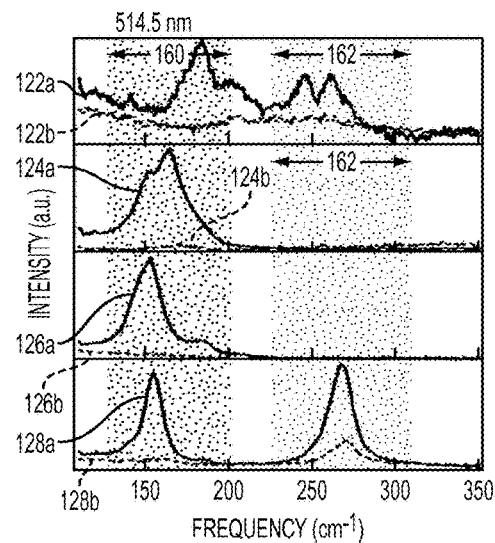
FIGS. 3A-D show Raman spectra of single-walled carbon nanotubes produced by high-pressure carbon monoxide catalysis (HiPco-SWCNTs), single-walled carbon nanotubes produced by arc discharge (AD-SWCNTs), and two subpopulations from a mixed nanotube population including double-walled carbon nanotubes and single-walled carbon nanotubes. Using methods according to the present teachings, one of the subpopulations is enriched with DWCNTs (DGU-DWCNTs), whereas the other subpopulation is enriched with SWCNTs (DGU-SWCNTs).

Throughout the description, where compositions are described as having, including, or comprising specific components, or where processes are described as having, including, or comprising specific process steps, it is contemplated that compositions of the present teachings also consist essentially of, or consist of, the recited components, and that the processes of the present teachings also consist essentially of, or consist of, the recited processing steps.

In the application, where an element or component is said to be included in and/or selected from a list of recited elements or components, it should be understood that the element or component can be any one of the recited elements or components or can be selected from a group consisting of two or more of the recited elements or components. Further, it should be understood that elements and/or features of a composition, an apparatus, or a method described herein can be combined in a variety of ways without departing from the spirit and scope of the present teachings, whether explicit or implicit herein.

The use of the terms "include," "includes," "including," "have," "has," "having," "contain," "contains," or "containing" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise.

It should be understood that the order of steps or order for performing certain actions is immaterial so long as the present teachings remain operable. Moreover, two or more steps or actions may be conducted simultaneously.

As used herein, a "nanotube" refers to an elongated hollow structure, for example, a cylindrical tube, having a nanoscale diameter, e.g., less than about 50 nm and usually less than about 10 nm, and typically a high aspect ratio. The present teachings can be useful for separating various elemental or molecular nanotubes including, but not limited to, carbon, boron, BN, $WS_2$, and $MoS_2$. As such, while the description and examples herein may refer specifically to carbon nanotubes, the present teachings are intended to encompass separation of nanotubes in general regardless of their composition.

As used herein, a "population" of nanotubes can include about greater than about $10^8$ nanotubes, greater than about $10^9$ nanotubes, greater than about $10^{10}$ nanotubes, greater than about $10^{11}$ nanotubes, greater than about $10^{12}$ nanotubes, greater than about $10^{13}$ nanotubes, greater than about $10^{14}$ nanotubes, greater than about $10^{15}$ nanotubes, greater than about $10^{16}$ nanotubes, or greater than about $10^{17}$ nanotubes. Further, by weight, a population of nanotubes can have a mass of about 0.001 µg, greater than about 0.01 µg, greater than about 0.1 µg, greater than about 1 µg, greater than about 10 µg, greater than about 100 µg, greater than about 1 mg, greater than about 10 mg, greater than about 100 mg, or greater than about 1 g. In certain embodiments of the present teachings, a separation cycle can be used to sort bulk quantities of nanotubes, for populations of nanotubes that include more than about $10^{12}$ nanotubes, more than about $10^{13}$ nanotubes, more than about $10^{14}$ nanotubes, more than about $10^{15}$ nanotubes, more than about $10^{16}$ nanotubes or more than about $10^{17}$ nanotubes; or equivalently, more than about 10 µg, more than about 100 µg, more than about 1 mg, more than about 10 mg, more than about 100 mg, or more than about 1 gram of nanotubes by mass.

As used herein, "enrichment" or "enriched" refers to an increase in the statistical proportion of nanotubes comprising one or more specific characteristics in a fraction obtained from a sample as compared to the sample as a whole. As described herein, a nanotube subpopulation that is "enriched" according to the present teachings by one or more properties, such as wall number, diameter, electronic type, chirality, or combinations thereof, means that the subpopulation (i.e., the enriched population) has a higher percentage of nanotubes having the one or more properties when compared to the starting population (i.e., the mixed population) from which the subpopulation is derived.

Various methods have been used to different degrees of success for separating SWCNTs by one or more characteristics such as chirality, diameter, and electronic type. However, the extension of separation methods for SWCNTs to DWCNTs and MWCNTs can be described as unpredictable at best. Because of their more complicated structures and intershell interactions, DWCNTs and MWCNTs can be expected to respond differently to a particular separation method when compared to SWCNTs. Using DWCNTs as an example, four distinct outer shell-inner shell combinations are possible, namely, metallic (M)-semiconducting (S), M-M, S-M, and S-S. It is not well known how the electronic type of the inner shell affects the electronic properties of a DWCNT as a whole. See e.g., Wang et al., *J. Phys. Chem. B*, vol. 109(37): 17361-17365 (2005). Similarly, it is not well known how the inner wall diameter and the interwall spacing modify the properties of a DWCNT. See e.g., Okada et al., *Phys. Rev. Lett.*, vol. 91(21): 216801(1)-216801(4) (2003). For example, it is often unpredictable how a SWCNT and an otherwise similar DWCNT, e.g., the outer shell of the DWCNT has similar characteristics as the SWCNT but for the presence of the inner shell, react differently to a particular functionalizing group. See e.g., Pfeiffer et al., *Phys. Rev. B*, vol. 72, 161404(R)(1)-161404(R)(4) (2005). To the inventors' knowledge, there has been no reported method for separating carbon nanotubes by wall number that allows isolation of DWCNTs and/or MWCNTs, or for separating DWCNTs and/or MWCNTs by one or more desirable characteristics of the outer shell such as chirality, diameter, and/or electronic type. In addition, it is unclear whether any of the separation methods that have been used with SWCNTs can distinguish between SWCNTS and DWCNTs and/or MWCNTs having similar outer shell characteristics.

The present teachings provide methods related to sorting nanotubes, in particular, carbon nanotubes, according to their wall number. More specifically, it has been found that density gradient ultracentrifugation (DGU) can be used to separate carbon nanotubes according to their wall number, thereby providing, for example, a separation fraction that includes primarily DWCNTs from an initial mixed population that includes DWCNTs, SWCNTs and/or MWCNTs. Furthermore, it has been found that with the appropriate choice of surface active component(s), the present teachings can lead to simultaneous separation (i.e., in a single separation cycle) of carbon nanotubes by wall number and at least one other property, e.g., diameter or electronic type. Accordingly, certain embodiments of the present methods can enable sorting of carbon nanotubes by both wall number and (outer wall) electronic type, while certain embodiments of the present methods can enable sorting of carbon nanotubes by both wall number and (outer wall) diameter. In addition, various embodiments of the present methods can separate carbon nanotubes of a specified wall number, for example, DWCNTs, based on one or more other properties such as electronic type, diameter and/or chirality.

In particular, as-synthesized DWCNT samples typically include unwanted SWCNTs having diameter ranges that overlap with the outer wall diameter ranges of at least a portion of the DWCNTs. Certain embodiments of the present teachings are directed to sorting small-diameter DWCNTs, i.e., DWCNTs having a mean outer wall diameter of less than about 2.0 nm (e.g., less than about 1.7 nm), from large-diameter SWCNTs, e.g., those having a mean diameter of greater than or about 1.4 nm, which has not been possible with prior art methods. For ease of comparison with DWCNTs, the diameter of SWCNTs sometimes may be referred herein as the outer wall diameter. It is understood by a person skilled in the art that a SWCNT consists of a single carbon tubule and therefore can have only one diameter.

In addition, while one of the advantages of the present teachings relates to simultaneous separation of carbon nanotubes by wall number and at least one other properties, sorting carbon nanotubes by multiple properties via more than one separation cycle is within the scope of the present teachings.

Accordingly, in some embodiments, the present teachings provide a method of separating carbon nanotubes by wall number. The present method can be used to sort as-synthesized samples of DWCNTs, which often include a mixed population of carbon nanotubes including DWCNTs and SWCNTs, DWCNTs and MWCNTs, or DWCNTS and both SWCNTs and MWCNTs. In addition, the mixed population can include SWCNTs and DWCNTs having overlapping outer wall diameter ranges. For example, the mixed population can include less than about 50%, less than about 60%, less than about 70%, less than about 75%, less than about 80%, less than about 85%, less than about 90%, or less than about 95% DWCNTs.

The mixed population of carbon nanotubes can be produced by one or more methods known in the art including chemical vapor deposition such as high-pressure carbon monoxide conversion (HiPco), laser ablation, arc discharge, coalescence, and specific catalytic processes such as CoMo-CAT® (SouthWest NanoTechnologies Inc., Norman, Okla.). In most embodiments, the mixed population includes pristine or as-synthesized carbon nanotubes when applied to the present methods. However, in certain embodiments, carbon nanotubes that have been chemically treated post-synthesis (e.g., doped or otherwise irreversibly functionalized) can be used as well.

Current synthetic methods of DWCNTs such as those listed above not only produce significant quantities of unwanted SWCNTs and/or MWCNTs, they also produce broad distributions of chiralities and diameters within the DWCNT population and the unwanted SWCNT and/or MWCNT population(s). For example, the mixed population can include DWCNTs having outer wall diameter ranges that are between about 0.9 nm and about 3.0 nm. The mixed population also can include SWCNTs having diameter ranges that are between about 0.7 nm and about 2.0 nm, for example, between about 0.8 nm and about 1.8 nm. As such, the mixed population can include SWCNTs and DWCNTs having overlapping diameter ranges and outer wall diameter ranges, in particular, between about 1.0 nm and about 2.0 nm. The present methods can separate DWCNTs having an outer wall diameter that is less than about 2.0 nm effectively from SWCNTs having similar diameters. For example, the present methods can separate DWCNTs having an outer wall diameter that is less than about 1.7 nm from SWCNTs having a diameter that falls within the same range, i.e., between about 1.1 nm and about 1.8 nm.

In some embodiments, a mixed (or polydisperse) nanotube population can be contacted with one or more surface active components in a solvent (e.g., water) to provide a dispersion. The one or more surface active components typically associate with the carbon nanotubes non-covalently, providing debundled individual carbon nanotubes "encapsulated" by the one or more surface active components. For example, the one or more surface active components can associate with the carbon nanotubes by one or more of ionic interaction, n-n orbital interaction, hydrogen bonding, and Van Der Waals interaction. As used herein, "encapsulate," "encapsulated," or "encapsulating" refers to non-covalent association with a target such as nanotubes. For example, the one or more surface active components can wrap around the sidewall (circumference) of the carbon nanotubes, yet not be present at the two ends of the nanotubes. In some embodiments, the surface active components can arrange themselves around the sidewall of a carbon nanotube as a helical monolayer. However, other arrangements, e.g., longitudinal or annular arrangement, are possible.

In various embodiments, nanotubes having different properties exhibit different buoyant densities upon association with (e.g., encapsulation by) the surface active components. The encapsulated nanotube complexes are introduced into a density gradient provided by a fluid medium and centrifuged. Over the course of the ultracentrifugation, the complexes move within the density gradient to their respective isopycnic points, that is, where their respective buoyant density matches the density of a particular layer of the density gradient. Upon sufficient centrifugation (i.e., for a selected period of time and/or at a selected rotational rate at least partially sufficient to separate the carbon nanotubes along the medium gradient), the complexes settle into multiple bands of materials according to the desirable characteristic(s) and can be removed layer by layer from the density gradient to provide separation fractions that primarily contain nanotubes having the desirable characteristic(s). The success of a separation can be defined as having the complexes settle into distinct bands of materials at different locations in the density gradient that are visible to human eye. For example, each band of materials can differ in colors or shades of similar colors.

Without limitation to any one theory or mode of operation, separation via density gradient centrifugation is believed to be driven largely by how the surface active component(s), for example, surfactant(s), organize around nanotubes of different structure and electronic type. The energetic balance among inter-nanotubes, solvent particles, and surface active components interactions as well as their packing density, orientation, ionization, and the resulting hydration of these surface active components can all be parameters affecting buoyant density and the quality of separation and purification. The buoyant density of an encapsulated nanotube in a fluid medium can depend on multiple factors, including the density and electronic character of the nanotube itself, the structure and composition of the surface active component(s) surrounding the nanotube, and the spatial extent of any electrostatically bound hydration layers. For DWCNTs and MWCNTs, additional parameters such as intershell interaction and interwall spacing are expected to contribute to unpredictable variations of the buoyant density of an encapsulated nanotube.

FIG. 1 illustrates how a particular surface active component (or a particular system including two or more surface active components) can associate with and confer different buoyant densities to a small-diameter single-walled nanotube, a large-diameter single-walled nanotube, and a double-walled nanotube having an outer wall diameter similar to the diameter of the large-diameter single-walled nanotube. For example, the surface active component can be sensitive to both wall number and diameter, such that upon association with the surface active component, the nanotubes can be separated according to their different buoyant densities, for example, the nanotubes can have increasing buoyant density in the order of small-diameter single-walled nanotube, large-diameter single-walled nanotube, and double-walled nanotube. It should be understood that a surface active component system comprises one or more surface active agents.

The one or more surface active components can be selected from a wide range of non-ionic or ionic (cationic, anionic, or zwitterionic) amphiphiles. In some embodiments, the surface active component can include an anionic surfactant. For example, a surface active component can include one or more sulfates, sulfonates, carboxylates, and combinations thereof. In certain embodiments, the one or more surface active components can include a compound having a planar polycyclic (e.g., carbocyclic) core. For example, the one or more surface active components can include a compound having a sterane core. In particular embodiments, the one or more surface active components can include one or more bile salts. Bile salts can be more broadly described as a group of molecularly rigid and planar amphiphiles with a charged face opposing a hydrophobic face. Examples of bile salts include salts (e.g., sodium or potassium salts) of conjugated or unconjugated cholates and cholate derivatives including deoxycholates, chenodeoxycholates, taurodeoxycholates, glycochenodeoxycholates, ursodeoxycholates, and glycoursodeoxycholates.

In some embodiments, amphiphiles with anionic head groups and flexible alkyl tails (interchangeably referred to herein as anionic alkyl amphiphiles) can be used. Examples of anionic alkyl amphiphiles include dodecyl sulfates and dodecylbenzene sulfonates such as sodium dodecyl sulfate (SDS) and sodium dodecylbenzene sulfonate (SDBS). In certain embodiments, the surface active component can include a cationic surfactant. For example, such a component can be selected from amphiphiles with cationic head groups (e.g., quaternary ammonium salts) and flexible or rigid tails. In some embodiments, deoxyribonucleic acid (DNA) such as single-stranded DNA or DNA fragments also can be used as the surface active component as described in U.S. patent application Ser. No. 11/368,581, the disclosure of which is incorporated by reference herein in its entirety.

However, to separate effectively nanotubes by wall number and by diameter, or by wall number and by electronic type, it has been found that the surface active component(s) should not interact with the nanotubes in a way that is simultaneously sensitive to both diameters and electronic types. For example, to enable effective separation by wall number and by diameter, the surface active component(s) need to be sensitive to diameter but sufficiently insensitive to electronic type, such that, for example, DWCNTs encapsulated by the appropriate surface active component(s) will have significantly higher buoyant densities than SWCNTs having similar diameters regardless of the electronic properties of the respective shells of the nanotubes. In this regard, planar surface active components have been found useful. As used herein, a planar surface active component refers to a surface active agent that includes a geometrically planar portion (e.g., a sterane core) which can have small substituent(s) thereon. In certain embodiments, the surface active components can consist of sodium cholate (SC).

Similarly, to enable effective separation by wall number and by electronic type, the surface active component(s) need to be sensitive to electronic type but sufficiently insensitive to diameter. It has been found that two or more surface active components (e.g., a co-surfactant system) can be used to effect such separation by selecting a relative ratio of the two or more surface active components that can cause nanotubes of a first electronic type (e.g., semiconducting) to have a lower buoyant density than nanotubes of a second electronic type (e.g., metallic), while the nanotubes are simultaneously sorted by wall number.

The two or more surface active components can be of the same type or of different types. In some embodiments, the two or more surface active components can competitively adsorb to the nanotube surface. For example, the at least two surface active components can have different molecular geometries and/or different functional groups. Such a competitive co-surfactant system can be used to achieve optimal separation between metallic and semiconducting nanotubes. In certain embodiments, the two or more surface active components can include two different bile salts. In some embodiments, the two or more surface active components can include a planar surface active component and a linear surface active component. As used herein, a linear surface active component refers to a surface active agent that includes a linear aliphatic group, for example, a linear aliphatic group with at least six carbon atoms. Examples include the various amphiphiles described above such as SDS and SDBS that include a flexible or rigid alkyl tail and a cationic or anionic head group.

In some embodiments, the two or more surface active components can comprise a co-surfactant system including varying amounts of SDS and SC. In certain embodiments, the present method can include using a co-surfactant system that includes a lower ratio of the linear surface active component relative to the planar surface active component to achieve simultaneous separation of nanotubes by wall number and by electronic type, particularly, with the separation by wall number having a dominant effect over the separation by electronic type. For example, using a co-surfactant system that includes an SDS:SC ratio of 1:4 (by weight), a mixed population that includes SWCNTs and DWCNTs of both electronic types can be expected to separate into four visibly distinct bands of materials (from low to high density) in the order of semiconducting SWCNTs (s-SWCNTs), metallic SWCNTs (m-SWCNTs), DWCNTs having a semiconducting outer wall (s-DWCNTs), and DWCNTs having a metallic outer wall (m-DWCNTs) in a single separation cycle. In other embodiments, the present method can include using a co-surfactant system that includes a higher ratio of the linear surface active component relative to the planar surface active component to achieve simultaneous separation of nanotubes by wall number and by electronic type, particularly, with the separation by electronic type having a dominant effect over the separation by wall number. For example, using a co-surfactant system that includes an SDS:SC ratio of 3:2 (by weight), a mixed population that includes SWCNTs and DWCNTs can be expected to separate into four visibly distinct bands of materials (from low to high density) in the order of m-SWCNTs, m-DWCNTs, s-SWCNTs, and s-DWCNTs in a single separation cycle.

Generally, density gradient centrifugation uses a fluid medium with a predefined variation in its density as a function of position within a centrifuge tube or compartment (i.e., a density gradient). Fluid media useful with the present teachings are limited only by nanotube aggregation therein to an extent precluding at least partial separation. Accordingly, aqueous and non-aqueous fluids can be used in conjunction with any substance soluble or dispersible therein, over a range of concentrations, so as to provide the medium a density gradient for use in the separation techniques described herein. Such substances can be ionic or non-ionic, non-limiting examples of which include inorganic salts and alcohols, respectively. Such a medium can include a range of aqueous iodixanol concentrations and the corresponding gradient of concentration densities. As understood by those skilled in the art, aqueous iodixanol is a common, widely used non-ionic density gradient medium. However, other media can be used in methods of the present teachings, as would be understood by those skilled in the art.

More generally, any material or compound stable, soluble or dispersible in a fluid or solvent of choice can be used as a density gradient medium. A range of densities can be formed by dissolving such a material or compound in the fluid at different concentrations, and a density gradient can be formed, for instance, in a centrifuge tube or compartment. More practically, with regard to choice of medium, the nanotubes, whether or not functionalized (e.g., by means of association with one or more surface active components), also should be soluble, stable or dispersible within the fluids/solvent or resulting density gradient. Likewise, from a practical perspective, the maximum density of the gradient medium, as determined by the solubility limit of such a material or compound in the solvent or fluid of choice, should be at least as large as the buoyant density of the particular nanotubes (and/or in composition with one or more surface active components) for a particular medium. Accordingly, any aqueous or non-aqueous density gradient medium can be used provided that the nanotubes are stable; that is, do not aggregate to an extent precluding useful separation. Alternatives to iodixanol include inorganic salts (such as CsCl, $Cs_2SO_4$, KBr, etc.), polyhydric alcohols (such as sucrose, glycerol, sorbitol, etc.), polysaccharides (such as polysucrose, dextrans, etc.), other iodinated compounds in addition to iodixanol (such as diatrizoate, nycodenz, etc.), and colloidal materials (such as Percoll®). Other parameters which can be considered upon choice of a suitable density gradient medium include the diffusion coefficient and the sedimentation coefficient, both of which can determine how quickly a gradient redistributes during centrifugation. Generally, for more shallow gradients, a larger diffusion coefficient and a smaller sedimentation coefficient are desired.

It has been discovered that the point at which the encapsulated nanotubes are introduced into the density gradient in the fluid medium can be important to the quality of the separation. In some embodiments, the encapsulated nanotubes are introduced into the density gradient at a density that is different from the buoyant density of any of the encapsulated nanotubes.

In particular embodiments, a two-iteration DGU process can be used to isolate DWCNTs from SWCNTs of roughly the same outer wall diameter. For example, in the first separation cycle, the carbon nanotubes can be loaded at the top of a linear gradient and made to sediment from lower to higher densities during the ultracentrifugation. By having the nanotubes sediment to higher densities, all the individually encapsulated SWCNTs inside the gradient should be unable to reach the dense isopycnic position of the DWCNTs. In contrast, a separation in which the nanotubes sediment from higher to lower densities can result in a poor separation, with a number of slow-moving SWCNTs reaching only the DWCNT equilibrium position. After ultracentrifugation, it can be expected that the SWCNTs and DWCNTs of similar outer wall diameters (e.g., having a mean outer wall diameter of about 1.6 nm) will settle into two different separation fractions, with the separation fraction enriched with SWCNTs settling above the separation fraction enriched with DWCNTs. If the mixed population further includes small-diameter SWCNTs (e.g., SWCNTs having a mean outer wall diameter of less than about 1.4 nm), these small-diameter SWCNTs can be expected to settle above the separation fraction enriched with the larger-diameter SWCNTs having similar diameters as the DWCNT outer walls. Any carbon nanotube bundles, MWCNTs, and carbonaceous impurities, if present, can be expected to settle below the separation fraction enriched with DWCNTs.

To achieve further enrichment of DWCNTs, the DWCNT-enriched separation fraction can be subjected to a second iteration of DGU processing. In the second separation cycle, the encapsulated DWCNTs can be introduced at the bottom (rather than at the top as in the first separation cycle) of the linear density gradient and made to sediment from high to low densities. Because nanotube bundles can be expected to form over time in nanotube dispersions, this second iteration helps remove SWCNT bundles that may have formed over time in addition to any slow-moving MWCNTs that did not sediment fast enough in the first iteration. Of course the second separation itself can be practiced as a method of the present teachings, where the starting population of nanotubes is a sample comprising substantially DWCNTs.

The separation fractions collected according to the procedures described herein can be sufficiently selective for most current applications of nanotubes. However, it can be desirable to purify further the separation fractions to improve their selectivity by performing additional iterations of the present methods. Specifically, a separation fraction can be provided in a composition with the same surface active component system or a different surface active component system, and the composition can be contacted with the same fluid medium or a different fluid medium, where the fluid medium can have a density gradient that is the same or different from the fluid medium from which the separation fraction was obtained. In certain embodiments, fluid medium conditions or parameters can be maintained from one separation to another. In other embodiments, at least one iterative separation can include a change of one or more parameters including the identity of the surface active component(s), medium identity, medium density gradient, and/or medium pH, as well as the duration and the rotational speed of the centrifugation process, with respect to one or more of the preceding separations. In certain embodiments, the surfactant(s) encapsulating the nanotubes can be modified or changed between iterations, allowing for even further refinement of separation. Separation fractions isolated after each separation can be washed before further complexation and centrifugation steps are performed.

The selectivity of the fraction(s) collected can be confirmed by various analytical methods including optical absorbance, Raman spectroscopy, transmission emission spectroscopy (TEM), fluorescence spectroscopy, and other methods known in the art.

As described herein, the present teachings provide nanotube populations that are substantially monodisperse in terms of wall number as well as populations of double-walled nanotubes that are substantially monodisperse in terms of their structures and/or properties. In other words, such populations generally have narrow distributions of one or more predetermined structural or functional characteristics. For example, in some embodiments, the population can be substantially monodisperse in terms of their diameter dimensions (e.g., greater than about 75%, including greater than about 90% and greater than about 97%, of the double-walled nanotubes in a population of double-walled nanotubes can have a diameter within less than about 0.5 Å of the mean diameter of the population, greater than about 75%, including greater than about 90% and greater than about 97%, of the double-walled carbon nanotubes in a population of double-walled nanotubes can have a diameter within less than about 0.2 Å of the mean diameter of the population, greater than about 75%, including greater than about 90% and greater than about 97%, of the double-walled nanotubes in a population of double-walled nanotubes can have a diameter within less than about 0.1 Å of the mean diameter of the population). In some embodiments, the population can be substantially monodisperse in terms of their outer wall electronic type (e.g., greater than about 70%, including greater than about 75%, greater than about 80%, greater than about 85%, greater than about 90%, greater than about 92%, greater than about 93%, greater than about 97% and greater than about 99%, of the double-walled nanotubes in a population of double-walled nanotubes can have a semiconducting outer wall, or greater than about 50%, including greater than about 75%, greater than about 90%, greater than about 97%, and greater than about 99%, of the double-walled nanotubes in a population of double-walled nanotubes can have a metallic outer wall). In some embodiments, the population can be substantially monodisperse in terms of their outer wall chiralities (e.g., greater than about 30%, including greater than about 50%, greater than about 75%, and greater than about 90%, of the double-walled nanotubes in a population of double-walled nanotubes can have outer walls having the same chirality (n, m) type).

The nanotube populations of the present teachings can be incorporated into various electronic, optical, or optoelectronic devices such as field-effect transistors, transparent conductors, interconnect devices, sensors, light-emitting diodes, and solar cells, to improve one or more electronic and/or optical properties of these devices. The present nanotube populations can be processed or analyzed 'as is,' i.e., with the individual nanotubes encapsulated by one or more surface active components; alternatively, the surface active components can be removed prior to or during analysis or processing. The one or more surface active components can be removed according to methods known in the art, for example, as disclosed in Meitl et al., *Nano Lett.*, 4: 1643 (2004); and Zhou et al., *Appl. Phys. Lett.*, 88: 123109 (2006).

The following examples are provided to illustrate further and to facilitate the understanding of the present teachings and are not in any way intended to limit the invention.

Example 1: Dispersion of Carbon Nanotubes and Concentration

The starting carbon nanotube material (Batch #: DW331UA) was obtained from Carbon Nanotechnologies Inc. (Houston, Tex.). The sample batch was indicated by the manufacturer to comprise approximately 70% DWCNTs with outer wall diameters ranging from about 1.5 nm to about 3.0 nm based on transmission electron microscopy (TEM). Optical absorbance data further characterized that about 22% to about 35% of the DWCNTs in the sample batch have an outer wall diameter of less than about 1.7 nm.

The carbon nanotube material was added to 110 mL of a 1% w/v sodium cholate (SC) aqueous solution at a loading of about 2 mg/mL in a steel beaker. This mixture was cooled in an ice bath, then subjected to horn ultrasonication using a 13 mm-diameter tip for 90 minutes at a power of 160 W. Following sonication, the dispersion was incorporated directly into a step gradient for concentration. The step gradient consisted of a dense underlayer of 2 mL of a 1% w/v SC aqueous solution with 60% w/v iodixanol topped by approximately 10 mL of the carbon nanotube dispersion. The step gradient was ultracentrifuged in an SW41 Ti swing-bucket rotor (Beckman-Coulter Inc.) at a rotational frequency of 41 krpm for 12 hours. Concentrated fractions or bands of carbon nanotube materials were removed from the centrifuge tube in a two step fractionation procedure. First, a 1 mL displacement layer consisting of a 1% w/v SC aqueous solution with 30% w/v iodixanol was slowly infused into the gradient to separate poorly dispersed carbon nanotubes from the buoyant, individually encapsulated carbon nanotubes. After upward displacement, the resulting concentrated band, with a density less than 30% w/v iodixanol was removed using a piston gradient fractionator (Biocomp Instruments Inc.).

Example 2: Sorting by Wall Number—First Iteration

Carbon nanotubes in the concentrated fraction from Example 1 were sorted by wall number in a gradient containing 1% w/v SC throughout. The density gradient consisted of a 1.5 mL underlayer containing 60% w/v iodixanol, followed by a 5 mL linear gradient (SG 15, Hoefer Inc.) with a density varying from 32.5% to 17.5% w/v iodixanol. On top of this linear gradient was added a 1 mL layer containing the concentrated dispersion of carbon nanotubes diluted to a density of 15% w/v iodixanol. The remaining ~4.5 mL of the centrifuge tube was filled with 0% w/v iodixanol solution. This linear gradient was ultracentrifuged for 12 hours at a rotational frequency of 41 krpm in an SW41 Ti rotor, at the end of which isopycnically separated SWCNTs and DWCNTs were produced.

FIG. 2a is a photograph of a centrifuge tube 100 containing a dispersion of a polydisperse carbon nanotube sample taken after one separation cycle according to the present methods, which resulted in the dispersion separating into four colored bands located at different buoyant densities. Band 102 corresponds to small-diameter SWCNTs; band 104 corresponds to large-diameter SWCNTs; band 108 corresponds to DWNTs; and the thick black band 110 includes very dense MWNTs, carbonaceous impurities, and bundled nanotubes. The transparent band 106 is substantially free of carbon nanotube materials.

To confirm these qualitative assignments, these bands of separated materials were extracted from the centrifuge tube using a piston gradient fractionator (Biocomp Instruments, Inc.) and characterized by optical absorbance (FIG. 2b). The topmost band 102 exhibits multiple discrete peaks in the visible and near infrared that can be assigned to optical transitions associated with SWCNTs having a diameter of about 0.7 nm to about 1.2 nm (curve 112). For the carbon nanotubes located in the band below (band 114), the optical absorbance (curve 114a) contains two broad peaks ranging from about 640 nm to about 860 nm and from about 900 nm to about 1300 nm that can be attributed to metallic and semiconducting SWCNTs, respectively, with average diameters of about 1.6 nm. For the DWCNT band (band 108), the optical absorbance (curve 118a) is similar to that of the large diameter SWCNTs indicating the DWCNT outer walls are of comparable diameter to the SWCNTs. In addition, a transition at about 1190 nm, discussed in more detail below, is indicative of absorbance from the inner walls of the DWCNTs. The optical absorbance of the dense, broad black band 110 exhibits further red-shifting of the semiconducting and metallic transitions as well as increased background absorbance (data not shown) which is consistent with nanotubes of larger diameters, as well as increased bundling and carbonaceous impurity content. Curves 116 and 120 correspond to the absorbance spectra of the transparent band 106 and the starting material, respectively.

Of these materials, a 2 mm thick band (band 104 in FIG. 2a) with an average density of 17.8% iodixanol (1.095 g/mL) was selected for a second iteration of sorting for its high large-diameter SWCNT content. Furthermore, a 2.5 mm thick band (band 108 in FIG. 1a) with an average density of 21.5% iodixanol (1.115 g/mL) was selected for a second iteration of sorting as a result of its large DWCNT content.

Example 3: Sorting by Wall Number—Second Iteration

The SWCNT- and DWCNT-enriched fractions were isolated and introduced into separate gradients consisting of the following layers, each with 1% w/v SC content. First, a dense, 1.5 mL underlayer of 60% w/v iodixanol was added to the bottom of the centrifuge tube, followed by a 1 mL layer of the enriched fraction diluted to a density of 33.5% w/v iodixanol. A 5 mL linear gradient with density running from 31% to 16% w/v iodixanol was added above the carbon nanotube layer and was topped by a ~4.5 mL layer with a density of 1 g/mL. This gradient was then ultracentrifuged in an SW41 Ti for 12 hours at 41 krpm. Following centrifugation, bands of isolated carbon nanotubes were recovered from the centrifuge tube using a piston gradient fractionator.

Absorbance spectra of the highly enriched SWCNT fraction (DGU-SWCNTs, curve 114b) and the highly enriched DWCNT fraction (DGU-DWCNTs, curve 118b) show significant improvement in sorting quality after two iterations (FIG. 2b). Compared to curves 114a and 118a, both materials exhibit decreased peak widths and lower background absorbance levels, which can be attributed to decreased numbers of bundled carbon nanotubes and smaller amounts of carbonaceous impurities.

Example 4: Characterization by Transmission Electron Microscopy

DGU-DWCNTs, initially dispersed in water with SC and iodixanol, were precipitated by diluting the nanotube dispersion with water to bring the SC concentration to less than 0.1% w/v, and subsequently diluted with isopropanol to completely withdraw the SC from the carbon nanotube sidewalls. The precipitates were filtered through anodized aluminum oxide membranes (Whatman Anodisc), and rinsed with copious amounts of water to remove the remaining SC and iodixanol. The resulting carbon nanotube films were immersed in acetone and freed from the membranes using bath sonication. The acetone in turn was removed by heating at 90° C. for two hours leaving solid, surfactant-free sorted carbon nanotube material.

The DGU-DWCNTs were redispersed in 3 ml of a 1% w/v sodium dodecyl sulfate (SDS) solution in deuterated water ($D_2O$) using a horn ultrasonicator (Fisher Scientific Model 500 Sonic Dismembrator). The ultrasonicator was equipped with a 3 mm diameter tip and operated at 15% amplitude for 90 minutes while the sample was cooled in an ice bath. Poorly dispersed carbon nanotube bundles were removed by ultracentrifugation for 14 minutes at 38 krpm in a Beckman Coulter TLA100.3 rotor. A 5 µL droplet from the top 2.5 mL layer of the dispersion was deposited on TEM grids coated with an ultrathin (<3 nm) carbon film (Prod. #01824, Ted Pella, Inc.). After ~30 seconds, the grid was dried using filter paper and rinsed in deionized water. The grid was then dried again using filter paper.

TEM images taken on JEOL JEM-2100F Fast TEM confirmed that the DGU-DWNTs predominantly consisted of double-walled species.

Example 5: Characterization and Diameter Determination Using Raman Spectroscopy

Previous studies of DWCNTs have revealed substantial differences in the Raman spectra of DWCNTs and SWCNTs following treatment with concentrated sulfuric acid and have been used to assess DWCNT content (see Kim et al., *Chem. Phys. Lett.,* 420: 377 (2006); Barros et al., *Phys. Rev. B,* 76: 045425 (2007); and Filho et al., *Nano Let.,* 7: 2383 (2007)).

To confirm that the increased buoyant densities and absorbance characteristics of DGU-DWCNTs did not arise from SWCNTs with bimodal diameter distributions, Raman spectra were obtained on thin film samples of DGU-SW-CNTs and DGU-DWCNTs. Specifically, DGU-SWCNTs and DGU-DWCNTs were processed into thin films of ~60% transmittance on glass and quartz substrates (see Wu et al., *Science,* 305: 1273 (2004)). For comparison, thin films of HiPco-SWCNTs (Carbon Nanotechnologies Inc.) and arc-discharge-grown SWCNTs (AD-SWCNTs, Carbon Solutions Inc.) having similar diameters to the inner walls and the outer walls of DGU-DWCNTs also were prepared on the same transparent substrates. Based on the optical absorbance of the DGU-DWCNTs, Raman spectra were measured at two different excitation wavelengths: 514.5 nm to probe DWCNTS having semiconducting outer walls and metallic inner walls, and 750 nm to probe DWCNTS having metallic outer walls and semiconducting inner walls (FIG. 3). The radial breathing mode (RBM) and G band spectra obtained from these samples (FIG. 3a and FIG. 3c) are consistent with the assignments derived from optical absorbance (FIG. 2b).

Because SWCNT diameters can be related to the RBM frequencies with the equation $\omega_{RBM}=A/d_t+B$ (see Bachilo et al., *Science,* 298: 2361-2366 (2002)), the values of A and B were first determined using the Raman spectra of thin films of as-produced HiPco-SWCNTs having a known chirality distribution. The RBM frequencies and diameters of the HiPco-SWCNTs were well described by a fit with A=218.2 and B=19.6.

To evaluate the mean diameters of the DGU-DWCNTs, the average RBM frequencies of the peaks associated with the inner wall and the outer wall of DWCNTs were calculated. These RBM frequencies were then converted to carbon nanotube diameters and corrected to account for differences in the laser power. The calculations revealed that the DGU-DWCNTs have mean inner wall diameters of ~0.86 nm and mean outer wall diameters of ~1.61 nm.

To ensure that signals arising from small-diameter carbon nanotubes were due to the inner wall of DWCNTs and not small-diameter SWCNT impurities, optical measurements were performed before and after the DGU-DWCNTs were subjected to chemical treatments selected to strongly affect the optical properties of the outer wall of the DWCNTs. Because the inner wall of DWCNTs should be isolated from adsorbed species by the protective outer wall, the optical characteristics of the inner nanotubes would be largely unaffected by the chemical treatment, unlike any SWCNT impurities.

Thin film samples of DGU-SWCNTs and DGU-DWCNTs were chemically treated by coating them with concentrated sulfuric acid (95-98%) for 10 minutes, after which any excess acid was removed using a jet of nitrogen gas, and the films were left to dry over several days.

Figure 3C:
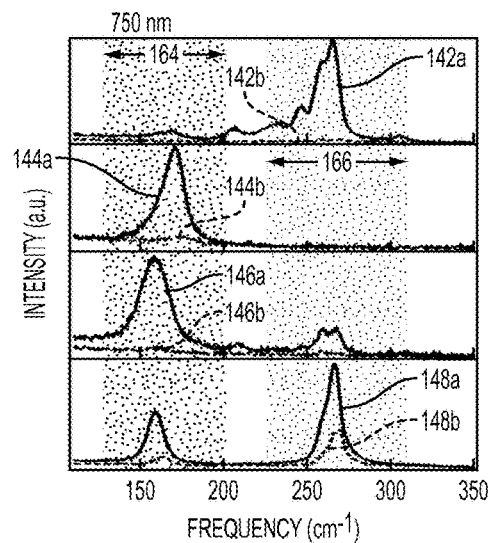
Figure 3B:
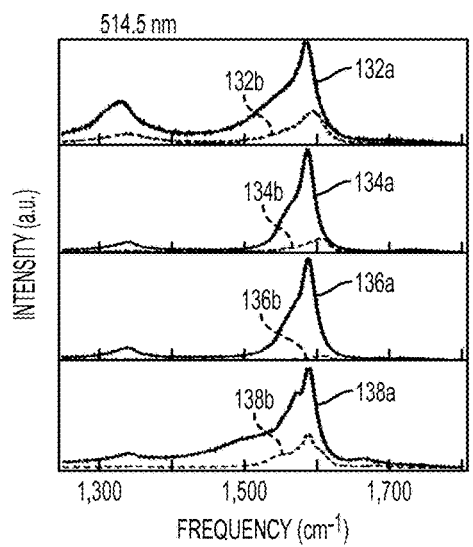
Figure 3D:
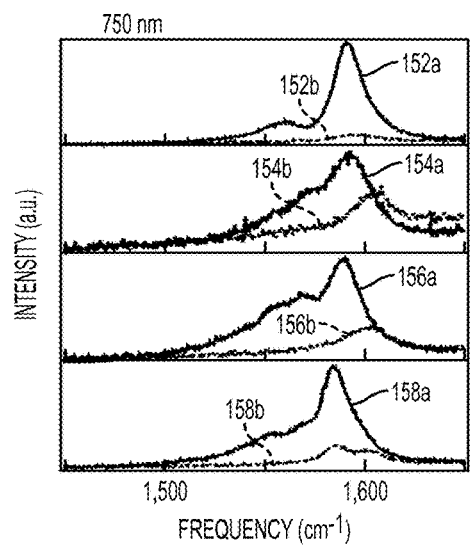
Figure 4A:
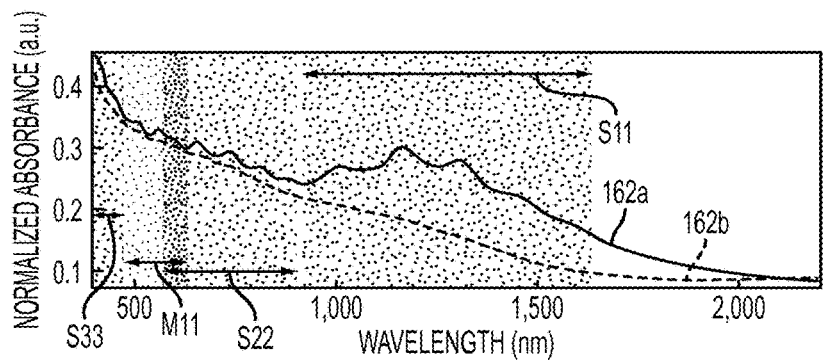
FIGS. 4A-D shows optical absorbance spectra of thin films of HiPco-SWCNTs, AD-SWCNTs, DGU-SWCNTs, and DGU-DWCNTs before (solid curves) and after (dashed curves) exposure to thionyl chloride.
Figure 4B:
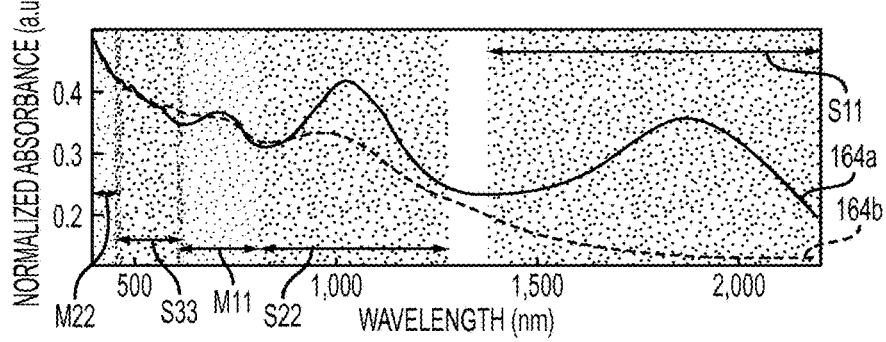
Figure 4C:
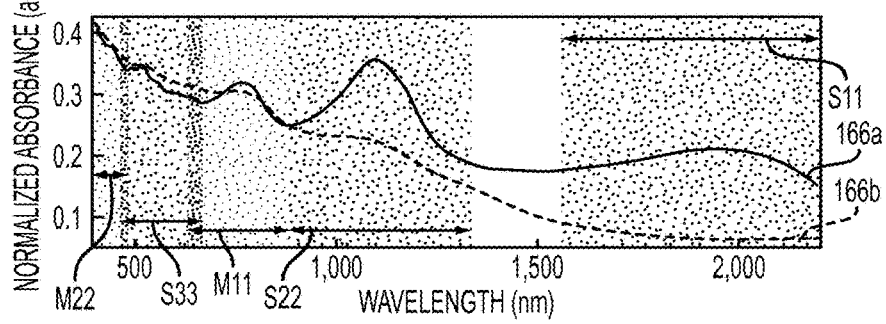
Figure 4D:
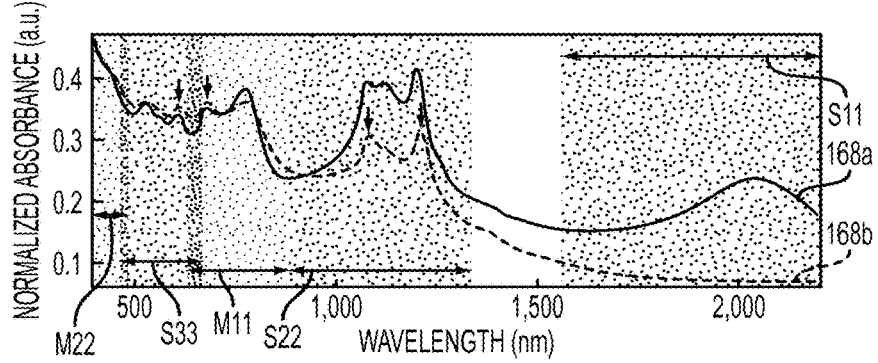

FIG. 3a shows the Raman spectra of the four nanomaterials (HiPco-SWCNTs—122, AD-SWCNTs—124, DGU-SWCNTs—126, and DGU-DWCNTs—128) measured as pristine films (solid curves, a) and films treated with sulfuric acid (dashed curves, b) at 514.5 nm excitation. FIG. 3b shows spectra from the carbon nanotube tangential modes (HiPco-SWCNTs—132, AD-SWCNTs—134, DGU-SW-CNTs—136, and DGU-DWCNTs—138) before (solid curves, a) and after (dashed curves, b) acid treatment at 514.5 nm excitation. FIG. 3c shows the Raman spectra of the four nanomaterials (HiPco-SWCNTs—142, AD-SW-CNTs—144, DGU-SWCNTs—146, and DGU-DWCNTs—148) measured as pristine films (solid curves, a) and films treated with sulfuric acid (dashed curves, b) at 750 nm excitation. FIG. 3d shows spectra from the carbon nanotube (HiPco-SWCNTs—152, AD-SWCNTs—154, DGU-SW-CNTs—156, and DGU-DWCNTs—158) tangential modes before (solid curves, a) and after (dashed curves, b) acid treatment at 750 nm excitation.

As described above, the Raman spectra 128a, 148a of DGU-DWCNTs exhibit RBMs corresponding to inner walls (162, 166) having an average diameter of ~0.86 nm and outer walls (160, 164) having an average diameter of ~1.61 nm. For DGU-SWCNTs 126a, 146a, the RBMs attributable to small diameter carbon nanotubes (c.f. HiPco-SWCNTs 122a, 142a) are completely absent at 514.5 nm and weak in intensity at 750 nm excitation. Moreover, the RBMs associated with large diameter nanotubes (c.f. AD-SWCNTs 124a, 144a) indicate the DGU-SWCNTs have an average diameter of ~1.60 nm, similar to the outer wall diameter of DGU-DWCNTs (128a, 148a).

The G-bands of the pristine SWCNT samples have peak shapes that can be adequately described by two Lorentzians corresponding to the $G^+$ and $G^-$ bands (FIG. 3b and FIG. 3d). Conversely, the DGU-DWCNT sample exhibits a G-band (FIG. 3b and FIG. 3d) with a finer structure with two pairs of $G^+$ and $G^-$ bands attributable to both the inner and outer tubes (see Kim et al., *Chem. Phys. Lett.,* 420: 377 (2006)).

Following acid treatment, all carbon nanotube films showed decreased Raman signal intensity and marked changes in their RBMs and G-band. Referring back to FIG. 3, pristine carbon nanotube films (solid curves) display significantly higher intensity than films treated with sulfuric acid (dashed curves). For both the control SWCNT samples (i.e., HiPco-SWCNTs and AD-SWCNTs) and DGU-SW-CNTs, RBMs were almost completely suppressed by the sulfuric acid treatment. However, as shown in FIG. 3, for DGU-DWCNTs, protection protected by the outer wall (as indicated by the shaded regions 160 and 164) preserves much of the RBM intensity of the inner wall (as indicated by the shaded regions 162 and 166) following acid doping. Meanwhile, RBMs associated with the outer walls were significantly reduced. In addition, the degree of inner-wall RBM attenuation was similar to that observed for the G-band of DGU-DWCNTs, indicating that much of the decrease in RBM intensity was due to changes in film morphology and thickness following acid treatment, not from large amounts of impurity SWCNTs.

For the tangential modes, the $G^+$ components for the SWCNTs and the DWCNT outer walls were upshifted by at least 5 $cm^{-1}$ following acid treatment. In contrast, the $G^+$ component corresponding to the inner walls of the DWCNTs was essentially fixed in frequency with a small upshift of ~1 $cm^{-1}$ as a result of the chemical resistance afforded by the outer wall.

Differences in the optical properties of pristine and thionyl chloride doped SWCNTs and DWCNTs were studied to provide further evidence of sorting by wall number. Thin films of HiPco-SWCNTs, AD-SWCNTs, DGU-SWCNTs, and DGU-DWCNTs were immersed in the acceptor-type dopant thionyl chloride (see U. Dettlaff-Weglikowska et al., *J. Am. Chem. Soc.* 127, 5125 (2005)) for 12 hours followed by drying in air for another 12 hours.

FIG. 4 shows optical absorbance spectra of thin films of HiPco-SWCNTs (162), AD-SWCNTs (164), DGU-SW-CNTs, (166), and DGU-DWCNTs (168) before (solid curves, a) and after (dashed curves, b) exposure to thionyl chloride. The absorbencies of the four pristine spectra were normalized to the n-plasmon at about 280 nm with the spectra of the doped films scaled by the same factor. The first-order, second-order, and third-order semiconducting optical transitions are shaded and labeled S11, S22, and S33; and the first-order and second-order metallic optical transitions are shaded and labeled M11 and M22.

Before doping, all four sets of films exhibited strong absorbance as a result of metallic and semiconducting chiralities as labeled in FIG. 4. For the three SWCNT samples and the outer wall of the DGU-DWCNTs, thionyl chloride treatment completely suppressed the first-order semiconducting transitions (S11) as a result of large shifts in the Fermi level induced by the dopant molecules. Other peaks associated with the second-order semiconducting transitions (S22) and first-order metallic transitions (M11) also were attenuated and broadened but could still be identified following treatment. In contrast, the DGU-DWCNT film maintains several sharp and intense absorption peaks in the S22, S33, and M11 regions as indicated by arrows in FIG. 4 before and after chemical treatment. Furthermore, the peaks corresponding to inner semiconducting carbon nanotubes in the 1,050 nm to 1,250 nm wavelength region displayed considerably smaller line widths than those of semiconducting HiPco-SWCNTs of the same diameter. Peak broadening typically occurs for SWCNTs as a result of increased nanotube-nanotube interactions when SWCNTs form bundles in thin films. The absence of peak broadening observed for the transitions in DGU-DWCNTs is yet further evidence that the inner walls of the DWCNTs are protected from the external environment by the outer carbon nanotube shell.

Example 6: Length Distribution of Sorted Carbon Nanotubes

Following optical characterization, the length distribution of DGU-SWCNTs and DGU-DWCNTs were quantified using atomic force microscopy (AFM). AFM samples were prepared as follows.

Preparation of AFM Samples:

Surfactant-encapsulated carbon nanotubes were deposited on $SiO_2$ capped Si wafers via a (3-aminopropyl)triethoxysilane (APS; Sigma-Aldrich) self-assembled monolayer. The monolayer was formed by immersing the Si wafers in 2.5 mM APS aqueous solution for at least 30 minutes. Following immersion, the wafers were dried under nitrogen gas, rinsed in deionized water, and dried again. To improve the yield of the deposition, the carbon nanotube dispersions were diluted into a 2% w/v SDS aqueous solution (Sigma-Aldrich). A 10 uL drop of the diluted dispersion was then placed on the silanized substrate and allowed to dry over 10 minutes. The remaining solution was blown off with nitrogen gas, and the wafer was rinsed in deionized water to remove adsorbed surfactant molecules. After drying with nitrogen, the wafers covered with carbon nanotubes at sub-monolayer coverage were heated at 250° C. in air for one hour to remove any remaining surfactants and iodixanol.

AFM images were obtained using a Thermo Microscopes Autoprobe CP-Research AFM operating in tapping mode. Conical AFM probes with a Cr—Au backside coating were used for all measurements (MikroMasch, NSC36/Cr—Au BS). Images 5 μm×5 μm in size were analyzed for determining the DGU-SWCNT and DGU-DWCNT length distributions and typically contained 10 to 30 carbon nanotubes each. Intersecting nanotubes whose paths could not be clearly identified and those that were clearly part of bundles were not included in the analysis.

The lengths of 356 individual DGU-SWCNTs and 392 individual DGU-DWCNTs were measured over multiple AFM images and compiled into the histogram shown in FIG. 5. The DGU-SWCNTs (open bars) were found to have an average length of about 626 nm, while the DGU-DWCNTs (shaded bars) were determined to be about 44% longer on average, with a mean length of about 904 nm. Both length distributions were found to follow log-normal distributions as indicated by the solid and dashed curves in FIG. 5. The difference in carbon nanotube length as a function of wall number can be attributed to improved mechanical properties of DWCNTs compared to SWCNTs. In particular, the sonication used to disperse carbon nanotubes into surfactant solution is known to decrease nanotube length as a result of tube cutting. However, DWCNTs, with the mechanical reinforcement of their inner wall, are expected to be more resistant to sonication-induced cutting compared to SWCNTs. Because both the DGU-SWCNTs and DGU-DWCNTs were exposed to identical sonication conditions, it follows that the DWCNT material should exhibit longer average lengths than the SWCNTs, assuming both classes of material had the same initial length distribution.

The observed resistance to tube cutting could be particularly beneficial in thin film applications of carbon nanotubes. The performance of thin film devices consisting of networks of carbon nanotubes previously has been hindered by two interrelated factors: nanotube polydispersity and nanotube length. Most applications of carbon nanotube thin films, such as flexible field effect transistors and transparent conductors, can benefit greatly from the use of carbon nanotubes that are monodisperse in both electronic type and diameter (see Arnold et al., *Nature Nanotech.*, 1: 60 (2006); and Green et al., *Nano Lett.*, 8: 1417 (2008)). However, to allow processing, carbon nanotube bundles need to be separated into individual carbon nanotubes on a large scale. Unfortunately, ultrasonication, the most common separation technique, reduces carbon nanotube length and as a result, increases the number of nanotube-nanotube junctions required for charge transport across the network, thereby impairing nanotube network performance. In view of the above, DWCNTs could prove to be an ideal class of carbon nanotubes for thin film device applications because they can maintain relatively long average lengths even after aggressive sonochemistry.

Example 7: Transparent Conductive Coatings Including Sorted Carbon Nanotubes

To test the thin film advantages of DGU-DWCNTs, DGU-DWCNTs were incorporated into a series of transparent conductive coatings and their performance was compared to that of DGU-SWCNTs films and films prepared from unsorted DWCNT materials. Specifically, the unsorted DWNT film samples were prepared from the same dispersion of sonicated carbon nanotubes used to produce the DGU-SWCNT and DGU-DWCNT materials (Example 1). A 1.5 mL volume of this starting dispersion was centrifuged for 30 minutes at 16,000 relative centrifugal force (Eppendorf Microcentrifuge 5424). The top 1.0 mL of solution, free of large bundles and poorly solubilised material, was decanted carefully and incorporated into control films of unsorted DWCNTs using vacuum filtration and transferred to glass substrates (see Wu et al., *Science*, 305: 1273 (2004)).

The sheet resistance and optical transmittance of the films were measured using a four-point probe and a spectrophotometer (Cary 500, Varian Inc.), respectively. For quantitative assessment of the behavior of each transparent conductive material, the experimental data was fit to the following equation:

$$T = \left(1 + \frac{1}{2R_S}\sqrt{\frac{\mu_0}{\varepsilon_0}}\frac{\sigma_{op}}{\sigma_{dc}}\right)^{-2}, \quad (1)$$

where $R_S$ is the sheet resistance, T is the wavelength dependent transmittance, $\sigma_{op}$ is the optical conductivity which varies as a function of wavelength, $\sigma_{dc}$ is the direct current conductivity, and $\mu_0$ and $\varepsilon_0$ are the permeability and permittivity of free space, respectively. Equation 1 has been used previously to describe the behavior of carbon nanotube transparent conductors (see Hu et al., *Nano Lett.*, 4: 2513 (2004); and Zhou et al., *Appl. Phys. Lett.*, 88: 123109 (2006)) and is particularly valuable in assessing the performance of DGU-processed material, because the sole fitting parameter $\sigma_{op}/\sigma_{dc}$ can be used to concisely quantify the performance improvement offered by different carbon nanotube materials (see Green et al., *Nano Lett.*, 8: 1417 (2008)).

For pristine DGU-DWCNTs at a wavelength of about 550 nm. $\sigma_{op}/\sigma_{dc}$ is 0.12 compared to 0.29 for DGU-SWCNTs and 0.58 for unsorted materials (FIG. 6a). This difference implies that transparent conductors containing DGU-DWCNTs are approximately 2.4 times and 4.8 times more conductive than those containing DGU-SWCNTs and unsorted nanotubes, respectively. As a result, a pristine DGU-SWCNT transparent conductor would have a sheet resistance of ~352Ω/□ at 75% transmittance while a DGU-DWCNT film at the same transmittance would provide a sheet resistance of ~146Ω/□.

To further enhance the electrical conductivity of the films, the carbon nanotube thin films were doped with thionyl chloride using the same procedure employed when studying the effects of doping on nanotube optical absorbance. Doping increased the thin film conductivity of the DGU-DWCNTs, DGU-SWCNTs and unsorted nanotubes by factors of 2.2, 3.8 and 2.0, respectively, at 550 nm (FIG. 6b). The differences in the effects of doping between the sorted materials could be due in part to higher metallic carbon nanotube content in the DGU-DWCNTs compared to the DGU-SWCNTs as indicated by differences in the relative intensities of first-order metallic and semiconducting transitions in the DGU-SWCNTs and DGU-DWCNTs (FIG. 4). In addition, the presence of inner walls in the DWCNTs could mitigate some of the effects of the adsorbed dopants. The lower conductivity of unsorted nanotubes compared to DGU-DWCNTs and DGU-SWCNTs can be explained by the presence of carbonaceous impurities in unsorted films that are typically removed during sorting. These impurities not only reduce the conductivity of pristine unsorted films, but also do not respond as strongly to chemical doping. Despite the larger conductivity increase demonstrated by the DGU-SWCNTs after thionyl chloride exposure, doped DGU-DWCNT films still exhibited ~42% higher conductivity than doped DGU-SWCNT networks. Furthermore, doped films generated from more weakly sonicated, longer DGU-DWCNTs produced sheet resistances as low as 40Ω/□ at 70% transmittance at a wavelength of 550 nm. The exemplary properties of the DGU-DWCNT films make them promising candidates for high-performance transparent conductor applications.

Example 8: Sorting of Carbon Nanotubes by Both Wall Number and Outer Wall Electronic Type Sorting by both wall number and (outer wall) electronic type were conducted in gradients with density profiles identical to those described in Examples 2 and 3 but with different surfactant loadings. The density profiles consisted of a 1.5 mL, 60% iodixanol underlayer, followed by a 1 mL carbon nanotube layer with a density of 35% w/v iodixanol. On top of this layer was a 5 mL linear gradient with densities ranging from 32.5% to 17.5% w/v iodixanol that was topped by a ~4.5 mL overlayer with 0% w/v iodixanol.

FIG. 7a and FIG. 7c show photographs of centrifuge tubes 200 and 300 each containing a dispersion of a polydisperse carbon nanotube sample (including a mixture of large-diameter SWCNTs and DWCNTs) after one separation cycle according to the present methods. The samples shown in FIG. 7a and FIG. 7c were sorted using surface active components designed to optimize separation of DWCNTs having a semiconducting outer wall (s-DWCNTs) and DWCNTs having a metallic outer wall (m-DWCNTs), respectively. For semiconductor enrichment, the overall surfactant loading was set to 1% w/v with a 1:4 SDS/SC ratio (by weight); hence, the gradient contained 0.2% w/v SDS and 0.8% w/v SC. For metallic enrichment, the overall surfactant loading was also 1% w/v with a 3:2 SDS/SC ratio. The two density gradients were ultracentrifuged in a SW41 Ti rotor for 12 hours at a rotational frequency of 41 krpm. Following ultracentrifugation, the carbon nanotubes enriched by electronic type were removed using a piston gradient fractionator.

Referring to FIG. 7a, two pairs of colored bands of sorted material appeared in the centrifuge tube 200. The upper bands were produced from SWCNTs sorted by electronic type (s-SWCNT band 202 in red, m-SWCNT band 204 in green) while the lower pair of bands corresponded to DWCNTs sorted by electronic type which possessed higher buoyant densities as a result of the density of the inner DWCNT wall (s-DWCNT band 206 in red, m-DWCNT band 208 in green).

Referring to FIG. 7c, again two pairs of colored bands of sorted material appeared in the centrifuge tube 300. However, the upper pair of bands are both green in color this time (m-SWCNTs 302, m-DWCNTs 304) suggesting metallic nanotubes, while the lower pair of bands are both red in color, suggesting semiconducting nanotubes (s-SWCNTs 306, s-DWCNTs 308).

Optical absorbance spectra confirmed the band assignment (FIGS. 6b and 6d). Enrichment by electronic type is evidenced by changes in the relative amplitude of transitions associated with metallic and semiconducting chiralities in each of the bands. Enrichment in metallic carbon nanotubes (214, 218, 312, 314) is indicated by strong absorbance in the wavelength ranges (M11, M22) associated with metallic carbon nanotubes and weak absorbance in the ranges (S22, S33) associated with semiconducting carbon nanotubes, while enrichment in semiconducting species (212, 216, 316, 318) is evidenced by the converse. DWCNTS (solid curves) are marked by characteristic optical absorbance peaks associated with their inner walls (labeled with arrows) that are absent in the absorbance of SWCNTs (dashed curves). The absorbance of the starting material is represented by curves 220 and 320.

Example 9: Comparison with State-of-the-Art High-Purity, As-Synthesized Double-Walled Carbon Nanotubes The literature has reported as-synthesized DWCNTs that are nominally about 95% pure. See Endo et al., *Nature*, vol. 433, 476 (2005), and Kim et al., *Chem. Vap. Deposition*, vol. 12, 327-330 (2006).

Figures 8A, 8B:
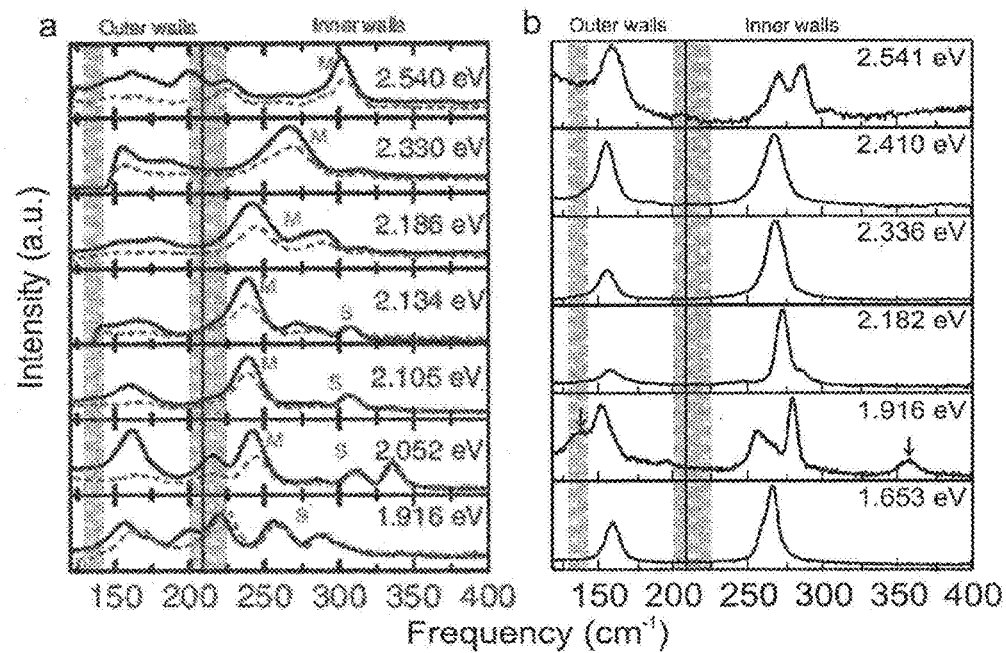
FIGS. 8A-B show Raman spectra of DGU-DWCNTs (FIG. 8B) as compared to state-of-the-art high-purity as-synthesized DWCNTs (FIG. 8A).

To compare the purity of these state-of-the-art materials with those of the sorted DWCNTs of the present teachings ("DGU-DWCNTs"), Raman spectra of DGU-DWCNTs were collected at nearly the same excitation energies and compared to the data reported in Barros et al., *Phys. Rev. B*, 76: 045425 (2007) ("Barros data"). The Barros data include Raman spectra of undoped DWCNTS (solid curves) and DWCNTs doped with $H_2SO_4$ (dashed curves), and are shown in FIG. 8a. Data of DGU-DWCNTs are shown in FIG. 8b. As can be seen from these spectra, the Barros DWCNTs and DGU-DWCNTs have very similar diameters (about 1.6 nm outer diameter and about 0.9 nm inner diameter) as indicated by similar frequencies of RBM peaks.

The DGU-DWCNTs only have two small peaks that can be identified as SWCNTs (as a result of their extreme diameters; indicated by arrows in FIG. 8b). In contrast, many peaks that can be associated with SWCNTs are apparent in the Barros data (see FIG. 8a). For instance, the shaded region covering frequencies ranging from about 200 $cm^{-1}$ to about 225 $cm^{-1}$ contains strong RBM peaks at multiple excitation energies. These peaks are associated with nanotubes of about 1 nm to about 1.2 nm. Because the interwal spacing of DWCNTs is about 0.7 nm, if these 1-1.2 nm diameter nanotubes are the inner walls of DWCNTs, their outer walls must be about 1.7 nm to about 1.9 nm in diameter. However, no RBM peaks corresponding to nanotubes having this outer wall diameter can be observed in the Barros data (marked by the shaded region covering frequencies ranging from about 125 $cm^{-1}$ to about 145 $cm^{-1}$). Consequently, these Raman data suggest that DGU-DWCNTs according to the present teachings are of higher purity than the state-of-the-art as-synthesized DWCNTs reported in the literature.

Example 10: Further Enrichment of Double-Walled Carbon Nanotubes by Electronic Type Carbon nanotubes (Batch #: DW411UA) obtained from Carbon Nanotechnologies, Inc. (Houston, Tex.) were dispersed into a 1% w/v SC aqueous solution as described in Example 1. The dispersion was concentrated and coarsely sorted by wall number in a single centrifugation step. This processing was accomplished by forming a 7 mL linear density gradient containing 1% w/v SC that varied from 25% w/v iodixanol to 40% w/v iodixanol and adding approximately 31 mL of the carbon nanotube solution on top. The resulting density gradient was ultracentrifuged in an SW28 rotor (Beckman-Coulter Inc.) for 22 hours at a rotational frequency of 28 krpm. The sorted carbon nanotubes were then removed from the centrifuge tube in a two step fractionation procedure. First, a 4 mL displacement layer consisting of 1% w/v SC aqueous solution with 40% w/v iodixanol was slowly infused into the gradient to separate poorly dispersed carbon nanotubes from the buoyant, individually encapsulated materials. After upward displacement, the sorted carbon nanotube fractions with densities less than 40% w/v iodixanol were removed using a piston gradient fractionator (Biocomp Instruments Inc.). Following characterization using optical absorbance, the fractions with the highest DWCNT content were selected for electronic type sorting.

Selective Separation of Double-Walled Carbon Nanotubes Having a Metallic Outer Wall Fractions highly enriched in DWCNTs having a metallic outer wall ("highly enriched m-DWCNTs") were produced in a two-iteration sorting process with density gradient parameters summarized in Table 1. In the first iteration, the DWCNT enriched material was injected at the bottom of the linear density gradient and the nanotubes moved upward in the density gradient during ultracentrifugation. This step removed dense carbon nanotube bundles and multi-walled carbon nanotubes, and resulted in pairs of metallic carbon nanotube and semiconducting carbon nanotube bands similar to those shown in FIG. 7c. Fractions enriched in m-DWCNTs from the first iteration were then placed at the top of the linear density gradient for the second iteration. As a result, buoyant, slow sedimenting SWCNTs were removed from the material during this separation leaving highly enriched m-DWCNT material in the denser regions of the gradient.

TABLE 1 m-DWCNT DGU Parameters

| | First Iteration | Second Iteration |
|---|---|---|
| Surfactant | 1% w/v 3:2 SDS/SC throughout | 1% w/v 3:2 SDS/SC throughout |
| Overlayer | 4.5 mL, 0% w/v iodixanol | 8 mL, 0% w/v iodixanol |
| Position of Nanotube Layer | Bottom of linear gradient | Top of linear gradient |
| Nanotube Layer | 1 mL, 37.5% w/v iodixanol; DWCNT enriched material | 10 mL, 3% w/v iodixanol; m-DWCNT enriched material from first iteration |
| Linear Density Gradient | 5 mL, 20% to 35% w/v iodixanol | 15 mL, 25% to 40% w/v iodixanol |
| Underlayer | 1.5 mL, 60% w/v iodixanol | 5 mL, 60% iodixanol |
| Ultracentrifugation Parameters | SW41 Ti, 12 hours at 41 krpm and 22° C. | SW28, 22 hours at 28 krpm and 22° C. |

Selective Separation of Double-Walled Carbon Nanotubes Having a Semiconducting Outer Wall Fractions highly enriched in DWCNTs having a semiconducting outer wall ("highly riched s-DWCNTs") were produced in a three-iteration sorting process with density gradient parameters summarized in Table 2. In the first iteration, the DWCNT enriched material was injected at the bottom of the linear density gradient and the nanotubes moved upward in the density gradient during ultracentrifugation. This step removed dense carbon nanotube bundles and multi-walled carbon nanotubes, and resulted in a pair of SWCNT and DWCNT bands similar to those shown in FIG. 7a. Fractions enriched in s-DWCNTs from the first iteration were then placed at the top of the linear density gradient for the second iteration. As a result, most buoyant, slow sedimenting SWCNTs were removed from the material during this separation leaving enriched s-DWCNT material in the denser regions of the gradient. Optical absorbance of these s-DWCNTs revealed the presence of >1.7 nm diameter m-SWCNTs. A third iteration in 1% w/v 3:2 was utilized to remove these impurity species, which banded in a lower density region of the gradient following ultracentrifugation.

TABLE 2 s-DWCNT DGU Parameters

|  | First Iteration | Second Iteration | Third Iteration |
|---|---|---|---|
| Surfactant | 1% w/v 1:4 SDS/SC throughout | 1% w/v 1:4 SDS/SC, except nanotube layer | 1% w/v 3:2 SDS/SC throughout |
| Overlayer | 4.5 mL, 0% w/v iodixanol | 8 mL, 0% w/v iodixanol | 2 mL, 0% w/v iodixanol |
| Position of Nanotube Layer | Bottom of linear gradient | Top of linear gradient | Top of linear gradient |
| Nanotube Layer | 1 mL, 37.5% w/v iodixanol; DWCNT enriched material | 10 mL, 3% w/v iodixanol; s-DWCNT enriched material from first iteration; 1% w/v SC with small amount of SDS | 3.5 mL, 3% w/v iodixanol; s-DWCNT enriched material from second iteration |
| Linear Density Gradient | 5 mL, 20% to 35% w/v iodixanol | 15 mL, 25% to 40% w/v iodixanol | 5 mL, 25% to 40% w/v iodixanol |
| Underlayer | 1.5 mL, 60% w/v iodixanol | 5 mL, 60% iodixanol | 1.5 mL, 60% iodixanol |
| Ultracentrifugation Parameters | SW41 Ti, 12 hours at 41 krpm and 22° C. | SW28, 22 hours at 28 krpm and 22° C. | SW41 Ti, 12 hours at 41 krpm and 22° C. |

Characterization of Highly Enriched s-DWCNTs and m-DWCNTs

Figure 9:
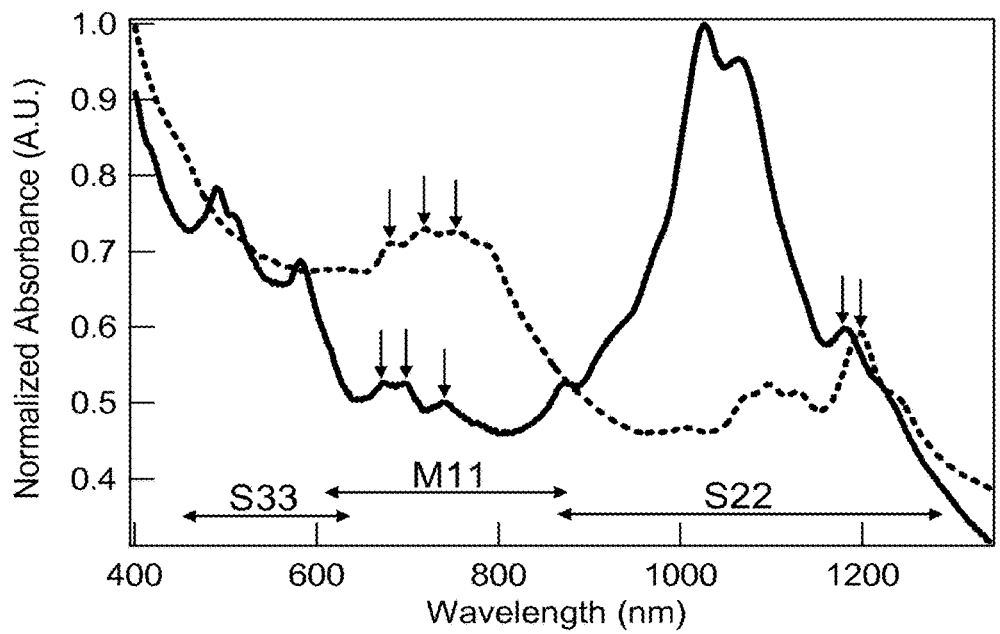
FIG. 9 shows the optical absorbance of sorted DWCNT samples in aqueous solution that are highly enriched by the outer wall electronic type, specifically, a sample highly enriched with DWCNTs having a semiconducting outer wall (s-DWCNT, solid curve), and a sample highly enriched with DWCNTs having a metallic outer wall (m-DWCNT, dashed curve).

Highly enriched s-DWCNTs and m-DWCNTs were characterized by optical absorbance and Raman spectroscopy to confirm enrichment by wall number and electronic type. FIG. 9 shows the optical absorbance from these materials in aqueous solution. The spectrum acquired from s-DWCNTs exhibits strong absorption peaks in the S22 and S33 regions associated with outer wall semiconducting transitions, while the absorption in the M11 region arising from metallic outer wall species is strongly suppressed. These features are consistent with outer wall semiconductor enrichment. The opposite behavior in the S22, S33, and M11 regions can be seen in the m-DWCNT material, which is consistent with outer wall metal enrichment. Weak peaks marked by arrows in FIG. 9 can be attributed to the DWCNT inner walls.

The optical absorbance of thin films of highly enriched s-DWCNTs and m-DWCNTs were measured to more conclusively identify optical transitions from the inner wall of the DWCNTs. Pristine thin films of the highly enriched s-DWCNTs (FIG. 10a, solid curve) and highly enriched m-DWCNTs (FIG. 10b, solid curve) exhibited strong absorbance peaks in the outer wall semiconductor (S11, S22, and S33) and metal (M11) transition ranges, respectively. Upon doping with thionyl chloride (dashed curves in FIG. 10a and FIG. 10b), the absorption peaks arising from the DWCNT outer walls were suppressed, leaving the inner wall transitions largely unaffected due to the protection afforded by the outer wall. These inner wall transitions are labeled with arrows and confirm that these materials contain predominantly double-walled species.

Figure 11:
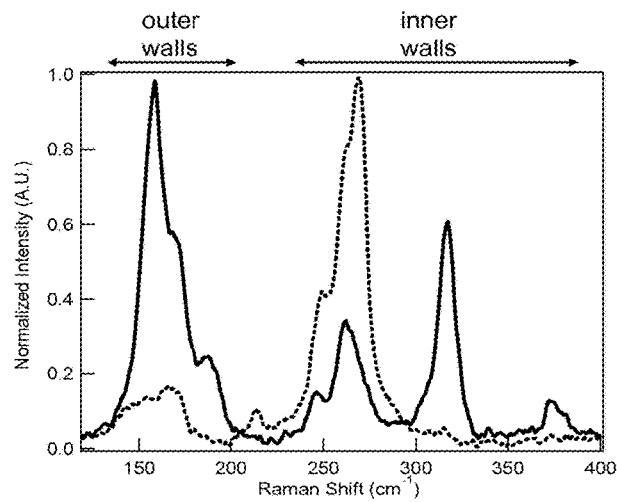
FIG. 11 shows Raman spectra in the RBM region obtained from s-DWCNTs (solid curve) and m-DWCNTs (dashed curve) at an excitation wavelength of 514.5 nm.

For further evidence of isolation by outer wall electronic type, Raman spectra were obtained from s-DWCNT and m-DWCNT films using a laser excitation wavelength of 514.5 nm (FIG. 11). This wavelength was selected because it is in resonance with the semiconducting DWCNT outer walls and the metallic DWCNT inner walls. For both materials, RBM peaks in the 240 $cm^{-1}$ to 360 $cm^{-1}$ range corresponding to nanotube diameters of 0.64 nm to 0.99 nm can be observed, a diameter range expected for DWCNT inner walls. In contrast, the strong RBM peak in the 150 $cm^{-1}$ to 190 $cm^{-1}$ range corresponding to outer wall diameters of 1.28 nm to 1.67 nm observed in the s-DWCNT material is suppressed by ~85% in the m-DWCNTs. Because predominantly s-DWCNTs are excited at 514.5 nm, the weakness of this particular RBM peak in the m-DWCNTs confirms that the material contains only low levels of s-DWCNTs.

Calculation of Purity Levels of Highly Enriched s-DWCNTs and m-DWCNTs

The level of enrichment by electronic type of the m-DWCNTs and s-DWCNTs was calculated following an established method (see Green et al., Nano Lett., 8: 1417 (2008)). In this analysis, optical absorbance spectra were used to calculate the areas in energy space of the first order metallic (M11) and first order semiconducting (S11) absorbance peaks of the m-DWCNTs and s-DWCNTs, as well as a control sample of unsorted AD-SWCNTs with known one-third metallic carbon nanotube content. The absorbance areas of the AD-SWCNT sample were then used to determine the extinction coefficient of the metallic carbon nanotubes, which was found to be a factor of 1.5 less than that of semiconducting carbon nanotubes. With this relative extinction factor, the percent metallic purities of the sorted DWCNTs were calculated using the following equation:

$$\% \text{ Metallic Purity} = 1.5 \times (M11\text{Area})/[1.5 \times (M11\text{Area}) + (S11\text{Area})]$$

The absorbance peak areas and calculated metallic purity levels are presented in Table 3. Intermediate levels of percent metallic purity can be obtained by combining different amounts of m-DWCNTs and s-DWCNTs.

TABLE 3 m-DWCNT and s-DWCNT Electronic Type Purity Levels

|  | Area of Absorbance Peak | | % Metallic |
|---|---|---|---|
| Sample | M11 | S11 | Purity |
| AD-SWCNTs | 2.44 | 7.31 | 33.3% |
| m-DWCNTs | 41.6 | 2.62 | 96.0% |
| s-DWCNTs | 0.532 | 19.1 | 4.0% |

Example 11: Field-Effect Transistors Produced from Thin Films of Highly Enriched s-DWCNTs and Highly Enriched m-DWCNTs Thin film field-effect transistors were fabricated with the highly enriched s-DWCNT materials ("s-DWCNT devices") and the highly enriched m-DWCNT materials ("m-DWCNT devices") as the active layer in the devices, respectively. To prepare these devices, gold/palladium electrodes were first defined on degenerately doped silicon wafers capped by a 100 nm thick dry thermal oxide. Percolating thin film networks of s-DWCNTs and m-DWCNTs produced by vacuum filtration were transferred onto the wafers and annealed in air for 20 minutes at 225° C. The devices were tested with a probe station (M-150, Cascade Microtech Inc.) inside a light-tight enclosure using two source meter units (KE2400, Keithley Inc.). Gate voltages were applied through the silicon substrate and gate leakage currents were monitored to ensure that they did not contribute significantly to the measured source-drain current. The devices have channel lengths and widths of 4 μm and 250 μm, respectively.

Figures 12A, 12B:
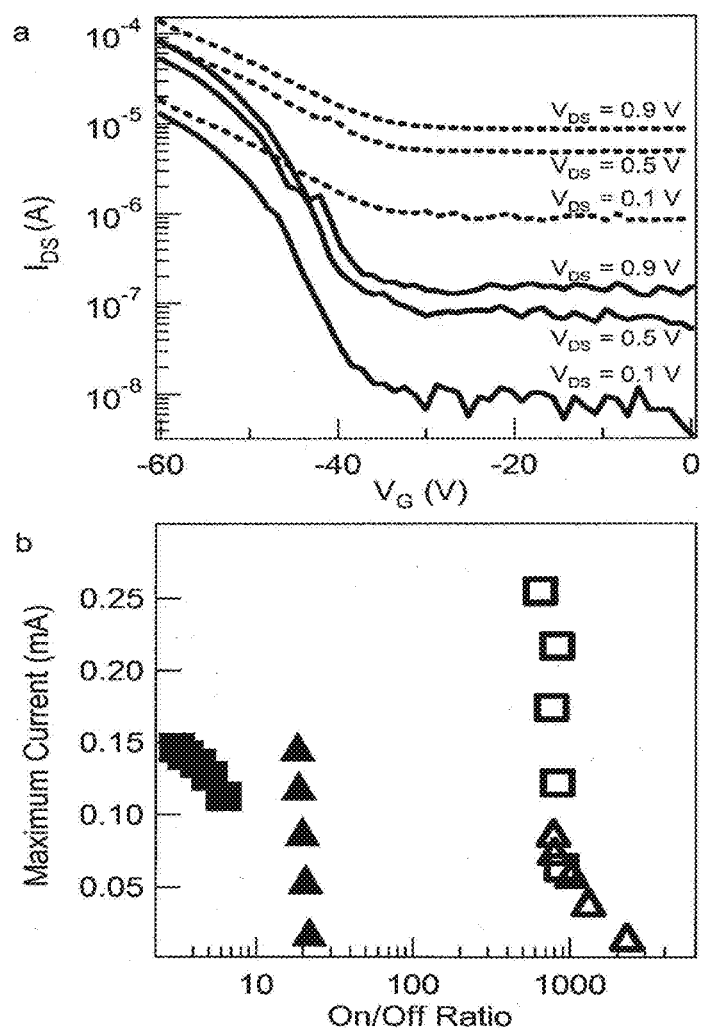
FIGS. 12A-B show data from field-effect transistors made from s-DWCNT and m-DWCNT thin films.

Transfer curves for the s-DWCNT devices (solid curves) and the m-DWCNT devices (dashed curves) are shown in FIG. 12a. While both types of devices were modulated in response to the gate voltage and had similar on currents, the s-DWCNT network exhibited an on/off ratio ~100 larger than that of the m-DWCNT network. The higher switching ratio of the s-DWCNT devices was expected as a result of its high semiconductor content. The switching ratio of a film of metallic single-walled carbon nanotubes was reported to be ~2 (see Arnold et al., *Nature Nanotech.*, 1: 60 (2006)). The higher on/off ratio observed in the m-DWCNT devices could be due to current modulation through the semiconducting inner walls of the m-DWCNTs.

FIG. 12b presents the variations in on/off ratios and on currents for the s-DWCNT devices (open symbols) and the m-DWCNT devices (closed symbols) at 2 μm (squares) and 4 μm (triangles) channel lengths. A significant increase in on/off ratios ($10^2$) for the s-DWCNT devices was observed at various on currents and for both channel lengths. Treating the s-DWCNT network as a uniform semiconducting film (see Arnold et al., *Nature Nanotech.*, 1: 60 (2006)), it is possible to extract a lower bound for the mobility of these devices from the linear region of the transfer curve. This analysis results in effective mobilities of ~7.6 $cm^2/V-s$ and ~4.2 $cm^2/V-s$ for the s-DWCNT devices of 2 μm and 4 μm channel lengths, respectively.

The present teachings encompass embodiments in other specific forms without departing from the spirit or essential characteristics thereof. The foregoing embodiments are therefore to be considered in all respects illustrative rather than limiting on the present teachings described herein. Scope of the present invention is thus indicated by the appended claims rather than by the foregoing description, and all changes that come within the meaning and range of equivalency of the claims are intended to be embraced therein.

We claim:

1. A method of separating carbon nanotubes by wall number, comprising:

centrifuging complexes of encapsulated nanotubes in contact with a first fluid medium comprising a first density gradient, so that the encapsulated nanotubes settle into multiple bands at different locations in the first density gradient according to wall number of the encapsulated nanotubes and are removable layer by layer from the first density gradient to provide separation fractions, each separation fraction being enriched with the encapsulated nanotubes according to the wall number of the encapsulated nanotubes, wherein the complexes comprise a carbon nanotube population having double-walled carbon nanotubes (DWCNTs) and single-walled carbon nanotubes (SWCNTs) individually encapsulated by one or more surface active components, and wherein the complexes are introduced into the first fluid medium at a density less than about 1.095 g/mL;

separating the centrifuged complexes along said first density gradient to obtain the separation fractions, wherein the separation fractions comprise a separation fraction enriched with the DWCNTs having a carbon nanotube subpopulation comprising a percentage of the DWCNTs higher than that of the DWCNTs in the carbon nanotube population; and centrifuging the separation fraction enriched with the DWCNTs in contact with a second fluid medium comprising a second density gradient, wherein the separation fraction enriched with the DWCNTs is introduced into the second fluid medium at a density greater than about 1.115 g/mL.

2. The method of claim 1, wherein the DWCNTs of the carbon nanotube population have a mean outer wall diameter of less than about 1.7 nm.

3. The method of claim 1, wherein the separation fractions comprise one or more separation fractions enriched with the SWCNTs, wherein each of the one or more separation fractions enriched with the SWCNTs has a carbon nanotube subpopulation comprising a percentage of the SWCNTs higher than that of the SWCNTs in the carbon nanotube population.

4. A method of separating carbon nanotubes by wall number, comprising:

centrifuging complexes of encapsulated nanotubes in contact with a first fluid medium comprising a first density gradient, so that the encapsulated nanotubes settle into multiple bands at different locations in the first density gradient according to wall number of the encapsulated nanotubes and are removable layer by layer from the first density gradient to provide separation fractions, each separation fraction being enriched with the encapsulated nanotubes according to the wall number of the encapsulated nanotubes, wherein the complexes comprise a carbon nanotube population having double-walled carbon nanotubes (DWCNTs) and carbon nanotubes (CNTs) having a wall number other than two, individually encapsulated by one or more surface active components, and wherein the encapsulated nanotubes are introduced into the first fluid medium at a density that is different from a buoyant density of any of the encapsulated nanotubes;

separating the centrifuged complexes along said first density gradient to obtain the separation fractions, wherein the separation fractions comprise a separation fraction enriched with the DWCNTs having a carbon nanotube subpopulation comprising a percentage of the DWCNTs higher than that of the DWCNTs in the carbon nanotube population; and centrifuging the separation fraction enriched with the DWCNTs in contact with a second fluid medium comprising a second density gradient, wherein the separation fraction enriched with the DWCNTs is introduced into the second fluid medium at a density greater than about 1.115 g/mL.

5. The method of claim 4, wherein the CNTs of the carbon nanotube population comprise multi-walled carbon nanotubes comprising three or more walls.

6. The method of claim 4, wherein the CNTs of the carbon nanotube population comprise single-walled carbon nanotubes (SWCNTs).

\* \* \* \* \*